United States Patent
Shinomiya

(10) Patent No.: US 7,441,214 B2
(45) Date of Patent: Oct. 21, 2008

(54) SEMICONDUCTOR INTEGRATED CIRCUIT DESIGNING APPARATUS, SEMICONDUCTOR INTEGRATED CIRCUIT DESIGNING METHOD, SEMICONDUCTOR INTEGRATED CIRCUIT MANUFACTURING METHOD, AND READABLE RECORDING MEDIA

(75) Inventor: Noriko Shinomiya, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 11/357,964

(22) Filed: Feb. 22, 2006

(65) Prior Publication Data

US 2006/0150134 A1 Jul. 6, 2006

Related U.S. Application Data

(62) Division of application No. 10/606,283, filed on Jun. 26, 2003, now Pat. No. 7,139,989.

(30) Foreign Application Priority Data

Jun. 27, 2002 (JP) .............................. 2002-188421

(51) Int. Cl.
  *G06F 17/50* (2006.01)
  *G06F 9/45* (2006.01)
(52) U.S. Cl. .................................. 716/5; 716/4; 716/6
(58) Field of Classification Search ............... 716/4–6; 703/13–22
See application file for complete search history.

(56) References Cited

U.S. PATENT DOCUMENTS

| | | | |
|---|---|---|---|
| 6,353,916 B1 * | 3/2002 | Kuwayama | .................... 716/6 |
| 6,446,016 B1 * | 9/2002 | Zhu | .............................. 702/69 |
| 6,842,727 B1 | 1/2005 | Hayashi | ........................ 703/18 |
| 6,876,210 B2 | 4/2005 | Shimazaki et al. | |

(Continued)

FOREIGN PATENT DOCUMENTS

EP 1 143 507 A1 10/2001

(Continued)

OTHER PUBLICATIONS

Van Heijningen, M. et al, "High-level Simulation of Substrate Noise Generation including Power Supply Noise Coupling," Annual ACM IEEE Design Automation Conference, Proceedings of the 37th conference on Design automation, 2000, pp. 446-451.

(Continued)

*Primary Examiner*—Jack Chiang
*Assistant Examiner*—Nghia M Doan
(74) *Attorney, Agent, or Firm*—Steptoe & Johnson LLP

(57) ABSTRACT

In LSI design, gate level logic circuit information, standard cell library information, and package information of a circuit block constituting an LSI chip are inputted, noise analysis is performed for the LSI chip using the inputted information, and the processing is ended when the amount of noise is within a predetermined range, while a logic gate in the circuit block is selected when the amount of noise is out of the predetermined range and a bypass condenser is added to the selected logic gate. Therefore, a bypass condenser having a required capacitance can be added in the vicinity of a noise source in the circuit block, whereby the noise can be reliably restricted to the predetermined range.

15 Claims, 14 Drawing Sheets

U.S. PATENT DOCUMENTS

| | | | |
|---|---|---|---|
| 6,880,134 B2 * | 4/2005 | Drennan | 716/2 |
| 6,941,258 B2 * | 9/2005 | Van Heijningen et al. | 703/16 |
| 6,951,002 B2 * | 9/2005 | Clabes et al. | 716/5 |
| 7,139,989 B2 * | 11/2006 | Shinomiya | 716/5 |
| 2001/0042238 A1 | 11/2001 | Ishikawa | 716/10 |

FOREIGN PATENT DOCUMENTS

| | | |
|---|---|---|
| JP | 2000-208634 A | 7/2000 |
| JP | 2001-291775 | 10/2001 |
| JP | 2001-351985 | 12/2001 |
| JP | 2002-9158 | 1/2002 |

OTHER PUBLICATIONS

Chen, Howard H., et al., "Power Supply Noise Analysis Methodology for Deep-Submicron VLSI Chip Design", IBM Research Division, Thomas J. Watson Research Center, Yorktown Heights, NY 10598, U.S.A., pp. 638-643.

* cited by examiner

SEMICONDUCTOR INTEGRATED CIRCUIT DESIGNING APPARATUS, SEMICONDUCTOR INTEGRATED CIRCUIT DESIGNING METHOD, SEMICONDUCTOR INTEGRATED CIRCUIT MANUFACTURING METHOD, AND READABLE RECORDING MEDIA

CLAIM OF PRIORITY

This application claims priority under 35 USC 371 of U.S. patent application Ser. No. 10/606,283, filed on Jun. 26, 2003, which claims priority of Japanese Patent Application No. 2002-188421, filed on Jun. 27, 2002, the entire contents of both of which are hereby incorporated by reference.

FIELD OF THE INVENTION

The present invention relates to a semiconductor integrated circuit designing apparatus for generating a pattern of a semiconductor integrated circuit such as an LSI provided with bypass condensers for reducing power supply noise and substrate noise, a semiconductor integrated circuit designing method employing the apparatus, a semiconductor integrated circuit manufacturing method employing the method for circuit design, and a computer-readable recording medium on which the method is recorded.

BACKGROUND OF THE INVENTION

Conventionally, a power supply noise occurs when a power supply current that flows at switching of a CMOS logic circuit passes through an inductor of a bonding wire of a package. Such power supply noise frequently occurs in digital circuits, and it adversely affects other equipment by electromagnetic interference (EMI). Further, in an analog/digital (A/D) mixed LSI, a noise that occurs in a digital circuit is transmitted through a substrate to an analog circuit, and adversely affects the performance of the analog circuit. This is known as "substrate noise".

The mechanism of occurrence of such power supply noise will be described with reference to FIG. 16.

In FIG. 16, a power supply terminal 121 and a ground terminal 122 of an LSI chip 120 are connected to an external power supply 150 of a package 130 through bonding wires having inductance components (inductors 140A and 140B), respectively. Further, in the LSI chip 120, an inverter circuit 131 of a CMOS structure, internal load 90 (90cp and 90cn), and a bypass condenser (decoupling capacitor) 111 are arranged in parallel. When an input voltage to the internal circuit of the TST chip 120 changes from a "L" level to a "H" level, a discharge current flows. At this time, a current path is formed through a node 132 at an output end of the inverter circuit 131 as shown by the arrow in FIG. 16.

In this case, the direction of the current passing through the inductor 140A connected to the power supply terminal 121 and the direction of the current passing through the inductor 140B connected to the ground terminal 121 are opposite to each other viewed from the inside of the LSI chip 120 due to fluctuations in the input voltage, whereby noises of opposite phases occur at the power supply terminal 121 and the ground terminal 122, respectively. Assuming that the power supply voltage is Vdd, the ground voltage is Vss, and the maximum voltage fluctuation width due to noise is Vn, an initial voltage fluctuation of Vdd−Vn occurs at the power supply terminal Vdd while an initial voltage fluctuation of Vss+Vn occurs at the ground terminal 122, and subsequently, a ringing operation due to an RLC circuit occurs, whereby symmetrical noises having opposite phases occur at the power supply terminal 121 and the ground terminal 122, respectively.

A typical method for reducing such power supply noise is to provide a bypass condenser 111 between the power supply terminal 121 and the ground terminal 122. In FIG. 16, the bypass condenser 111 is provided in the LSI chip 120. Since the internal load 90 is operated using electric charge stored in the bypass condenser 111, fluctuations in the amount of current supplied from the external power supply 150 through the inductors 140A and 140B can be suppressed, resulting in a reduction in noise.

Further, as the bypass condenser 111 is placed closer to the noise source (e.g., bonding wire), the noise reduction effect is enhanced. Ideally, the bypass condenser 111 should be placed in the same position as the operating circuit to minimize the amount of noise.

As a conventional method for providing such bypass condenser 111 on an LSI chip 120, Japanese Published Patent Application No. 2000-208634 discloses a method for fabricating a bypass condenser in a vacant area after layout design.

However, there may arise a case where a bypass condenser having a required capacitance cannot be secured by only the vacant area after layout design.

On the other hand, as a method for mounting a bypass condenser having a required capacitance, there is disclosed a method for optimizing the capacitance of a bypass condenser by repeating circuit simulation and floor planing, in "Power Supply Noise Analysis Methodology for Deep-Submicron VLSI Chip Design", 1997 Design Automation Conference, Haward H. Chan et al.

In this method, first of all, an initial layout of functional blocks is input to a floor planner. Next, an area n where noise occurs frequently is specified by circuit simulation, and a capacitance Cn of a bypass condenser, which is necessary for reducing the amount of noise to a predetermined value or lower in the specified area n, is calculated.

Next, the total of bypass condensers to be added is modeled as at least one virtual block bk having a capacitance larger than the capacitance Cn, and the virtual block bk is inserted between the already-arranged functional blocks.

In the conventional structure, however, even if a bypass condenser having a required capacitance is placed in a vacant area after layout design, the position where the bypass condenser is placed is between a circuit block and a circuit block, and therefore, the bypass condenser is distant from the noise source in the circuit block, resulting in little effect of noise reduction.

SUMMARY OF THE INVENTION

The present invention is made to solve the above-described problems and has for its object to provide a semiconductor integrated circuit designing apparatus which can reliably restrict the amount of noise within a predetermined range by adding a bypass condenser having a required capacitance in the vicinity of a noise source in a circuit block, a semiconductor integrated circuit designing method using the above-described apparatus, a semiconductor integrated circuit manufacturing method using the above-described method for circuit design, and a computer-readable recording medium on which the above-described method is recorded.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a semiconductor integrated circuit designing apparatus for automatically generating a pattern of a semiconductor integrated circuit under control of a computer, and the apparatus comprises: an input means for inputting gate level logic circuit information, standard cell library information, and package information of a circuit block as a constituent of the semiconductor integrated circuit; a noise analysis means for performing noise analysis for the circuit block using the information inputted by the input means; a noise judgement means for judging whether the amount of noise that occurs in the circuit block is within a predetermined range or not, on the basis of a result of noise analysis by the noise analysis means; a processing ending means for ending the automatic generation of the pattern of the semiconductor integrated circuit, when it is judged by the noise judgement means that the amount of noise is within the predetermined range; a logic gate selection means for selecting a logic gate in the circuit block, which generates an amount of noise larger than a predetermined amount of noise, when it is judged by the noise judgement means that the amount of noise in the circuit block is out of the predetermined range; and a bypass condenser addition means for adding a bypass condenser for reducing power supply noise and substrate noise to the selected logic gate. Therefore, a bypass condenser having a required capacitance can be effectively added in the vicinity of a noise source in the circuit block, whereby the amount of noise in the semiconductor integrated circuit can be reliably restricted to a predetermined range. Further, since addition of the bypass condenser is carried out on the basis of the result of noise analysis, the bypass condenser having a required capacitance can be provided in a highly precise and efficient location in the circuit block, thereby avoiding an increase in chip area of a semiconductor integrated circuit such as an LSI, due to the bypass condenser having an unnecessarily large capacitance.

According to a second aspect of the present invention, in the semiconductor integrated circuit designing apparatus according to the first aspect, the noise analysis means creates a data table on which at least one of a current waveform or a power supply current and a current waveform of a substrate current is recorded, which current waveforms are obtained when the input pattern of each logic gate in the circuit block and the capacitance of a bypass condenser incorporated in the logic gate are changed, and performs noise analysis using the created data table. Therefore, even when there is no cell comprising a bypass condenser having a desired capacitance in the standard cell library and thereby a cell comprising a bypass condenser having a desired capacitance should be newly added, a current waveform of the cell to be added can be interpolated by calculation using a data table having current waveforms which are obtained by varying the capacitance of the bypass condenser in several patterns, whereby addition of the cell is facilitated.

According to a third aspect of the present invention, in the semiconductor integrated circuit designing apparatus according to the first aspect, the logic gate selection means selects a logic gate which generates a maximum amount of noise in the circuit block, on the basis of a result of noise analysis. Therefore, the bypass condenser can be added in the vicinity of a noise source generating great noise in the circuit block, whereby the noise can be reduced more efficiently.

According to a fourth aspect of the present invention, in the semiconductor integrated circuit designing apparatus according to the first aspect, the logic gate selection means calculates a noise influence level which is a degree of influence of noise that occurs in each logic gate in the circuit block, using the inputted information and floor plan information of the semiconductor integrated circuit, and selects a logic gate having a maximum noise influence level. Therefore, the bypass condenser can be added in the vicinity of a noise source generating great noise in the circuit block, whereby the noise can be reduced more efficiently.

According to a fifth aspect of the present invention, there is provided a semiconductor integrated circuit designing apparatus for automatically generating a pattern of a semiconductor integrated circuit under control of a computer, and the apparatus comprises: an input means for inputting gate level logic circuit information, standard cell library information, and package information of a circuit block as a constituent of the semiconductor integrated circuit; a noise estimation means for estimating an amount of noise that may occur in the circuit block, using the information inputted by the input means; a capacitance constraint designation means for designating a capacitance constraint that is a capacitance of a bypass condenser for reducing power supply noise and substrate noise, which bypass condenser is to be incorporated in the circuit block to restrict the amount of noise within a predetermined range, on the basis of a result of estimation by the noise estimation means; a comparison means for comparing an on-chip capacitance that is a capacitance of a bypass condenser incorporated in the circuit block, with the capacitance constraint; a processing ending means for ending the automatic generation of the pattern of the semiconductor integrated circuit, when the on-chip capacitance is larger than the capacitance constraint in the comparison by the comparison means; a logic gate selection means for selecting a logic gate in the circuit block, which logic gate generates an amount of noise equal to or larger than a predetermined amount of noise, when the on-chip capacitance is equal to or smaller than the capacitance constraint in the comparison by the comparison means; and a bypass condenser addition means for adding a bypass condenser to the logic gate selected by the logic gate selection means. Since the capacitance of a bypass condenser to be added is previously restricted by noise estimation, there is no necessity for repeating noise analysis, whereby addition of the bypass condenser in the circuit block can be carried out in a short time. As a result, the amount of noise in the semiconductor integrated circuit can be reliably restricted to a predetermined range in a short time.

According to a sixth aspect of the present invention, in the semiconductor integrated circuit designing apparatus according to the fifth aspect, the logic gate selection means calculates a noise influence level which is a degree of influence of noise that occurs in each logic gate in the circuit block, using the inputted information and floor plan information of the semiconductor integrated circuit, and selects a logic gate having a maximum noise influence level. Therefore, the bypass condenser can be added in the vicinity of a noise source generating great noise in the circuit block, whereby the noise can be reduced more efficiently.

According to a seventh aspect of the present invention, there is provided a semiconductor integrated circuit designing apparatus for automatically generating a pattern of a semiconductor integrated circuit under control of a computer, and the apparatus comprises: an input means for inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range; a gate level conversion means for converting the functional specification information of the logic circuit into gate level logic circuit information on the basis of functional levels; a mapping means for performing a mapping process of assigning cells in the standard cell library information to all logic gates in the gate level logic circuit, respectively; a comparison means for comparing an on-chip capacitance which is a capacitance of a bypass condenser that is incorporated in the logic circuit subjected to the mapping by the mapping means, with the capacitance constraint; a processing ending means for ending the automatic generation of the pattern of the semiconductor integrated circuit, when the on-chip capacitance is larger than the capacitance constraint in the comparison by the comparison means; a logic gate selection means for selecting a logic gate which generates an amount of noise larger than a predetermined amount of noise, when the on-chip capacitance is smaller than the capacitance constraint in the comparison by the comparison means; and a mapping change means for assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate. Therefore, as the whole circuit block, the bypass condenser-equipped cell can be assigned to the logic gate generating a large amount of noise while satisfying the capacitance constraint of the bypass condenser, whereby the bypass condenser having a required capacitance can be effectively added in the vicinity of a noise source in the circuit block. As a result, the amount of noise in the semiconductor integrated circuit can be reliably restricted to a predetermined range. Further, since the cell library includes the cells having equivalent logic and different capacitances of bypass condensers, an increase in chip area of a semiconductor integrated circuit such as an LSI chip due to addition of unnecessarily many bypass condensers can be avoided by appropriately using the bypass condensers according to the amount of noise.

According to an eighth aspect of the present invention, there is provided a semiconductor integrated circuit designing apparatus for automatically generating a pattern of a semiconductor integrated circuit under control of a computer, and the apparatus comprises: an input means for inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise; a cell arrangement means for arranging cells in a plurality of cell lines that are parallel with each other, according to the net list information; a comparison means for comparing an on-chip capacitance that is a capacitance of a bypass condenser incorporated in the circuit block, with the capacitance constraint; a processing ending means for ending the automatic generation of the pattern of the semiconductor integrated circuit when the on-chip capacitance is larger than the capacitance constraint in the comparison by the comparison means; and a bypass condenser cell addition means for inserting a bypass condenser cell in the cell lines when the on-chip capacitance is equal to or smaller than the capacitance constraint in the comparison by the comparison means. Therefore, the bypass condenser can be inserted in the cell lines arranged in the circuit block, whereby a place where the bypass condenser is to be arranged can be secured in the vicinity of a noise source. As a result, an increase in area of a semiconductor integrated circuit due to addition of a bypass condenser cell is suppressed, and the noise of the semiconductor integrated circuit can be reliably restricted to a predetermined range.

According to a ninth aspect of the present invention, there is provided a semiconductor integrated circuit designing method for automatically generating a pattern of a semiconductor integrated circuit under control of a computer, and the method comprises: an input step of inputting gate level logic circuit information, standard cell library information, and package information of a circuit block as a constituent of the semiconductor integrated circuit; a noise analysis step of performing noise analysis for the circuit block using the inputted information; a noise judgement step of judging whether the amount of noise that occurs in the circuit block is within a predetermined range or not, on the basis of a result of the noise analysis; a processing ending step of ending the automatic generation of the pattern of the semiconductor integrated circuit, when it is judged that the amount of noise is within the predetermined range; a logic gate selection step of selecting a logic gate in the circuit block, which generates an amount of noise larger than a predetermined amount of noise, when it is judged that the amount of noise in the circuit block is out of the predetermined range; and a bypass condenser addition step of adding a bypass condenser for reducing power supply noise and substrate noise to the selected logic gate; wherein, after the bypass condenser is added in the bypass condenser addition step, the processing returns to the noise analysis step, wherein noise analysis is carried out for the circuit block in which the bypass condenser is added. Therefore, a bypass condenser having a required capacitance can be effectively added in the vicinity of a noise source in the circuit block, whereby the amount of noise in the semiconductor integrated circuit can be reliably restricted to a predetermined range. Further, since addition of the bypass condenser is carried out on the basis of the result of noise analysis, the bypass condenser having a required capacitance can be provided in a highly precise and efficient location in the circuit block, thereby avoiding an increase in chip area of a semiconductor integrated circuit such as an LSI, due to the bypass condenser having an unnecessarily large capacitance.

According to a tenth aspect of the present invention, in the semiconductor integrated circuit designing method according to the ninth aspect, the noise analysis stop creates a data table on which at least one of a current waveform of a power supply current and a current waveform of a substrate current is recorded, which current waveforms are obtained when the input pattern of each logic gate in the circuit block and the capacitance of a bypass condenser incorporated in the logic gate are changed, and performs noise analysis using the created data table. Therefore, even when a cell having a desired capacitance of bypass condenser does not exist in the standard cell library and so a cell having the desired capacitance of bypass condenser should be newly added, a current waveform of the cell to be added can be interpolated by calculation using a data table having current waveforms obtained when the capacitance of bypass condenser is varied in several patterns, whereby addition of a cell is facilitated.

According to an eleventh aspect of the present invention, in the semiconductor integrated circuit designing method according to the ninth aspect, the logic gate selection step selects a logic gate which generates a maximum amount of noise in the circuit block, on the basis of a result of noise analysis. Therefore, the bypass condenser can be added in the vicinity of a noise source generating great noise in the circuit block, whereby the noise can be reduced more efficiently.

According to a twelfth aspect of the present invention, in the semiconductor integrated circuit designing method according to the ninth aspect, the logic gate selection step calculates a noise influence level which is a degree of influence of noise that occurs in each logic gate in the circuit block, using the inputted information and floor plan information of the semiconductor integrated circuit, and selects a logic gate having a maximum noise influence level. Therefore, the bypass condenser can be added in the vicinity of a noise source generating great noise in the circuit block, whereby the noise can be reduced more efficiently.

According to a thirteenth aspect of the present invention, there is provided a semiconductor integrated circuit designing method for automatically generating a pattern of a semiconductor integrated circuit under control of a computer, and the method comprises: an input step of inputting gate level logic circuit information, standard cell library information, and package information of a circuit block as a constituent of the semiconductor integrated circuit; a noise estimation step of estimating an amount of noise that may occur in the circuit block, using the inputted information; a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise; a comparison step of comparing an on-chip capacitance that is a capacitance of a bypass condenser incorporated in the circuit block, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate; wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint. Since the capacitance of a bypass condenser to be added is previously restricted by noise estimation, there is no necessity for repeating noise analysis, whereby addition of the bypass condenser in the circuit block can be carried out in a short time. As a result, the amount of noise in the semiconductor integrated circuit can be reliably restricted to a predetermined range in a short time.

According to a fourteenth aspect of the present invention, in the semiconductor integrated circuit designing method according to the thirteenth aspect, the logic gate selection step calculates a noise influence level which is a degree of influence of noise that occurs in each logic gate in the circuit block, using the inputted information and floor plan information of the semiconductor integrated circuit, and selects a logic gate having a maximum noise influence level. Therefore, the bypass condenser can be added in the vicinity of a noise source generating great noise in the circuit block, whereby the noise can be reduced more efficiently.

According to a fifteenth aspect of the present invention, there is provided a semiconductor integrated circuit designing method for automatically generating a pattern of a semiconductor integrated circuit under control of a computer, and the method comprises: an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range; a gate level conversion step of converting the functional specification information of the logic circuit into gate level logic circuit information on the basis of functional levels; a mapping step of performing a mapping process for assigning cells in the standard cell library information to all logic gates in the gate level logic circuit, respectively; a comparison step of comparing an on-chip capacitance which is a capacitance of a bypass condenser that is incorporated in the logic circuit subjected to the mapping process, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate; wherein, after the other cell is assigned or the bypass condenser cell is additionally assigned in the mapping change step, the processing returns to the comparison step, wherein the on chip capacitance that is the capacitance of the bypass condenser incorporated in the circuit block in which the other cell is assigned or the bypass condenser cell is additionally assigned, is compared with the capacitance constraint. Therefore, as the whole circuit block, the bypass condenser-equipped cell can be assigned to the logic gate generating a large amount of noise while satisfying the capacitance constraint of the bypass condenser, whereby the bypass condenser having a required capacitance can be effectively added in the vicinity of a noise source in the circuit block. As a result, the amount of noise in the semiconductor integrated circuit can be reliably restricted to a predetermined range.

According to a sixteenth aspect of the present invention, in the semiconductor integrated circuit designing method according to the fifteenth aspect, the standard cell library information is cell library information to be used for design of the semiconductor integrated circuit, and includes information of at least one set of bypass condenser-incorporated cells having equivalent logic and different capacitances of the incorporated bypass condensers. Therefore, using the cell library, a bypass condenser can be incorporated in the cell constituting the circuit block, whereby the bypass condenser can be placed in the vicinity of a noise source to effective reduce the noise. Further, since the cell library includes the cells having equivalent logic and different capacitances of bypass condensers, an increase in chip area of a semiconductor integrated circuit such as an LSI chip due to addition of unnecessarily many bypass condensers can be avoided by appropriately using the bypass condensers according to the amount of noise.

According to a seventeenth aspect of the present invention, there is provided a semiconductor integrated circuit designing method for automatically generating a pattern of a semiconductor integrated circuit under control of a computer, and the method comprises: an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise; a cell arrangement step of arranging cells in a plurality of cell lines that are parallel with each other, according to the net list information; a comparison step of comparing an on-chip capacitance that is a capacitance of a bypass condenser incorporated in the circuit block, with the capacitance constraint; a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step; wherein, after the bypass condenser cell is inserted in the bypass condenser cell addition step, the processing returns to the comparison step, wherein the on-chip capacitance that is the capacitance of the bypass condenser incorporated in the circuit block in which the bypass condenser cell is inserted, is compared with the capacitance constraint. Therefore, the bypass condenser can be inserted in the cell lines arranged in the circuit block, whereby a place where the bypass condenser is to be arranged can be secured in the vicinity of a noise source. As a result, an increase in area of a semiconductor integrated circuit due to addition of a bypass condenser cell is suppressed, and the noise of the semiconductor integrated circuit can be reliably restricted to a predetermined range.

According to an eighteenth aspect of the present invention, there is provided a semiconductor integrated circuit manufacturing method for manufacturing a semiconductor integrated circuit using, for circuit design, a semiconductor integrated circuit designing method for automatically generating a pattern of the semiconductor integrated circuit under control of a computer, and the semiconductor integrated circuit designing method comprises: an input step of inputting gate level logic circuit information, standard cell library information, and package information of a circuit block as a constituent of the semiconductor integrated circuit; a noise analysis step of performing noise analysis for the circuit block using the inputted information; a noise judgement step of judging whether the amount of noise that occurs in the circuit block is within a predetermined range or not, on the basis of a result of the noise analysis; a processing ending step of ending the automatic generation of the pattern of the semiconductor integrated circuit, when it is judged that the amount of noise is within the predetermined range; a logic gate selection step of selecting a logic gate in the circuit block, which generates an amount of noise larger than a predetermined amount of noise, when it is judged that the amount of noise in the circuit block is out of the predetermined range; and a bypass condenser addition step of adding a bypass condenser for reducing power supply noise and substrate noise to the selected logic gate; wherein, after the bypass condenser is added in the bypass condenser addition step, the processing returns to the noise analysis step, wherein noise analysis is carried out for the circuit block in which the bypass condenser is added. Therefore, a bypass condenser having a required capacitance can be provided in a highly precise and effective place in the circuit block, whereby a semiconductor integrated circuit which can reliably restrict noise within a predetermined range can be manufactured without increasing the chip area of the LSI.

According to a nineteenth aspect of the present invention, there is provided a semiconductor integrated circuit manufacturing method for manufacturing a semiconductor integrated circuit using, for circuit design, a semiconductor integrated circuit designing method for automatically generating a pattern of the semiconductor integrated circuit under control of a computer, and the semiconductor integrated circuit designing method comprises: an input step of inputting gate level logic circuit information, standard cell library information, and package information of a circuit block as a constituent of the semiconductor integrated circuit; a noise estimation step of estimating an amount of noise that may occur in the circuit block, using the inputted information; a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise; a comparison step of comparing an on-chip capacitance that is a capacitance of a bypass condenser incorporated in the circuit block, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate; wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint. Since the capacitance of the bypass condenser to be added is previously restricted by noise estimation, there is no necessity for repeatedly performing noise analysis, whereby a semiconductor integrated circuit that can reliably restrict noise within a predetermined range can be manufactured in a shorter time.

According to a twentieth aspect of the present invention, there is provided a semiconductor integrated circuit manufacturing method for manufacturing a semiconductor integrated circuit using, for circuit design, a semiconductor integrated circuit designing method for automatically generating a pattern of the semiconductor integrated circuit under control of a computer, and the semiconductor integrated circuit designing method comprises: an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range; a gate level conversion step of converting the functional specification information of the logic circuit into gate level logic circuit information on the basis of functional levels; a mapping step of performing a mapping process for assigning cells in the standard cell library information to all logic gates in the gate level logic circuit, respectively; a comparison step of comparing an on-chip capacitance which is a capacitance of a bypass condenser that is incorporated in the logic circuit subjected to the mapping process, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate; wherein, after the other cell is assigned or the bypass condenser cell is additionally assigned in the mapping change step, the processing returns to the comparison step, wherein the on-chip capacitance that is the capacitance of the bypass condenser incorporated in the circuit block in which the other cell is assigned or the bypass condenser cell is additionally assigned, is compared with the capacitance constraint. Therefore, as the whole circuit block, the bypass condenser-equipped cell can be assigned to the logic gate generating a large amount of noise while satisfying the capacitance constraint of the bypass condenser, whereby a semiconductor integrated circuit that can reliably restrict noise within a predetermined range can be manufactured by adding the bypass condenser having a required capacitance in the vicinity of a noise source in the circuit block.

According to a twenty-first aspect of the present invention, there is provided a semiconductor integrated circuit manufacturing method for manufacturing a semiconductor integrated circuit using, for circuit design, a semiconductor integrated circuit designing method for automatically generating a pattern of the semiconductor integrated circuit under control of a computer, and the semiconductor integrated circuit designing method comprises: an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise; a cell arrangement step of arranging cells in a plurality of cell lines that are parallel with each other, according to the net list information; a comparison step of comparing an on-chip capacitance that is a capacitance of a bypass condenser incorporated in the circuit block, with the capacitance constraint; a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step; wherein, after the bypass condenser cell is inserted in the bypass condenser cell addition step, the processing returns to the comparison step, wherein the on-chip capacitance that is the capacitance of the bypass condenser incorporated in the circuit block in which the bypass condenser cell is inserted, is compared with the capacitance constraint. Therefore, the bypass condenser can be inserted in the cell lines arranged in the circuit block, whereby a semiconductor integrated circuit that can reliably restrict noise within a predetermined range can be manufactured by securing a place where the bypass condenser is to be arranged in the vicinity of a noise source, and inserting the bypass condenser in the place.

According to a twenty-second aspect of the present invention, there is provided a readable recording medium in which a semiconductor integrated circuit designing program for making a computer execute processing of designing a semiconductor integrated circuit is computer-readably recorded, and the semiconductor integrated circuit designing program comprises: an input step of inputting gate level logic circuit information, standard cell library information, and package information of a circuit block as a constituent of the semiconductor integrated circuit; a noise analysis step of performing noise analysis for the circuit block using the inputted information; a noise judgement step of judging whether the amount of noise that occurs in the circuit block is within a predetermined range or not, on the basis of a result of the noise analysis; a processing ending step of ending the automatic generation of the pattern of the semiconductor integrated circuit, when it is judged that the amount of noise is within the predetermined range; a logic gate selection step of selecting a logic gate in the circuit block, which generates an amount of noise larger than a predetermined amount of noise, when it is judged that the amount of noise in the circuit block is out of the predetermined range; and a bypass condenser addition step of adding a bypass condenser for reducing power supply noise and substrate noise to the selected logic gate; wherein, after the bypass condenser is added in the bypass condenser addition step, the processing returns to the noise analysis step, wherein noise analysis is carried out for the circuit block in which the bypass condenser is added. Therefore, a bypass condenser having a required capacitance can be effectively added in the vicinity of a noise source in the circuit block, whereby the amount of noise in the semiconductor integrated circuit can be reliably restricted to a predetermined range. Further, since addition of the bypass condenser is carried out on the basis of the result of noise analysis, the bypass condenser having a required capacitance can be provided in a highly precise and efficient location in the circuit block, thereby avoiding an increase in chip area of a semiconductor integrated circuit such as an LSI, due to the bypass condenser having an unnecessarily large capacitance.

According to a twenty-third aspect of the present invention, there is provided a readable recording medium in which a semiconductor integrated circuit designing program for making a computer execute processing of designing a semiconductor integrated circuit is computer-readably recorded, and the semiconductor integrated circuit designing program comprises; an input step of inputting gate level logic circuit information, standard cell library information, and package information of a circuit block as a constituent of the semiconductor integrated circuit; a noise estimation step of estimating an amount of noise that may occur in the circuit block, using the inputted information; a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise; a comparison step of comparing an on-chip capacitance that is a capacitance of a bypass condenser incorporated in the circuit block, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate; wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint. Since the capacitance of a bypass condenser to be added is previously restricted by noise estimation, there is no necessity for repeating noise analysis, whereby addition of the bypass condenser in the circuit block can be carried out in a short time. As a result, the amount of noise in the semiconductor integrated circuit can be reliably restricted to a predetermined range in a short time.

According to a twenty-fourth aspect of the present invention, there is provided a readable recording medium in which a semiconductor integrated circuit designing program for making a computer execute processing of designing a semiconductor integrated circuit is computer-readably recorded, and the semiconductor integrated circuit designing program comprises: an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range; a gate level conversion step of converting the functional specification information of the logic circuit into gate level logic circuit information on the basis of functional levels; a mapping step of performing a mapping process for assigning cells in the standard cell library information to all logic gates in the gate level logic circuit, respectively; a comparison step of comparing an on-chip capacitance which is a capacitance of a bypass condenser that is incorporated in the logic circuit subjected to the mapping process, with the capacitance constraint; a processing ending step of ending the automatic generation of the pattern of the semiconductor integrated circuit, when the on-chip capacitance is larger than the capacitance constraint in the comparison step; a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate; wherein, after the other cell is assigned or the bypass condenser cell is additionally assigned in the mapping change step, the processing returns to the comparison step, wherein the on-chip capacitance that is the capacitance of the bypass condenser incorporated in the circuit block in which the other cell is assigned or the bypass condenser cell is additionally assigned, is compared with the capacitance constraint. Therefore, as the whole circuit block, the bypass condenser-equipped cell can be assigned to the logic gate generating a large amount of noise while satisfying the capacitance constraint of the bypass condenser, whereby the bypass condenser having a required capacitance can be effectively added in the vicinity of a noise source in the circuit block. As a result, the amount of noise in the semiconductor integrated circuit can be reliably restricted to a predetermined range. Further, since the cell library includes the cells having equivalent logic and different capacitances of bypass condensers, an increase in chip area of a semiconductor integrated circuit such as an LSI chip due to addition of unnecessarily many bypass condensers can be avoided by appropriately using the bypass condensers according to the amount of noise.

According to a twenty-fifth aspect of the present invention, there is provided a readable recording medium in which a semiconductor integrated circuit designing program for making a computer execute processing of designing a semiconductor integrated circuit is computer-readably recorded, and the semiconductor integrated circuit designing program comprises: an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise; a cell arrangement step of arranging cells in a plurality of cell lines that are parallel with each other, according to the net list information; a comparison step of comparing an on-chip capacitance that is a capacitance of a bypass condenser incorporated in the circuit block, with the capacitance constraint; a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step; wherein, after the bypass condenser cell is inserted in the bypass condenser cell addition step, the processing returns to the comparison step, wherein the on chip capacitance that is the capacitance of the bypass condenser incorporated in the circuit block in which the bypass condenser cell is inserted, is compared with the capacitance constraint. Therefore, the bypass condenser can be inserted in the cell lines arranged in the circuit block, whereby a place where the bypass condenser is to be arranged can be secured in the vicinity of a noise source. As a result, an increase in area of a semiconductor integrated circuit due to addition of a bypass condenser cell is suppressed, and the noise of the semiconductor integrated circuit can be reliably restricted to a predetermined range.

DETAILED DESCRIPTION OF THE PREFERRED EMBODIMENTS

Hereinafter, first to fourth embodiments of semiconductor integrated circuit designing apparatuses according to the present invention will be successively described with reference to the drawings, taking low-noise LSI designing apparatuses as examples.

Embodiment 1

Figure 1:
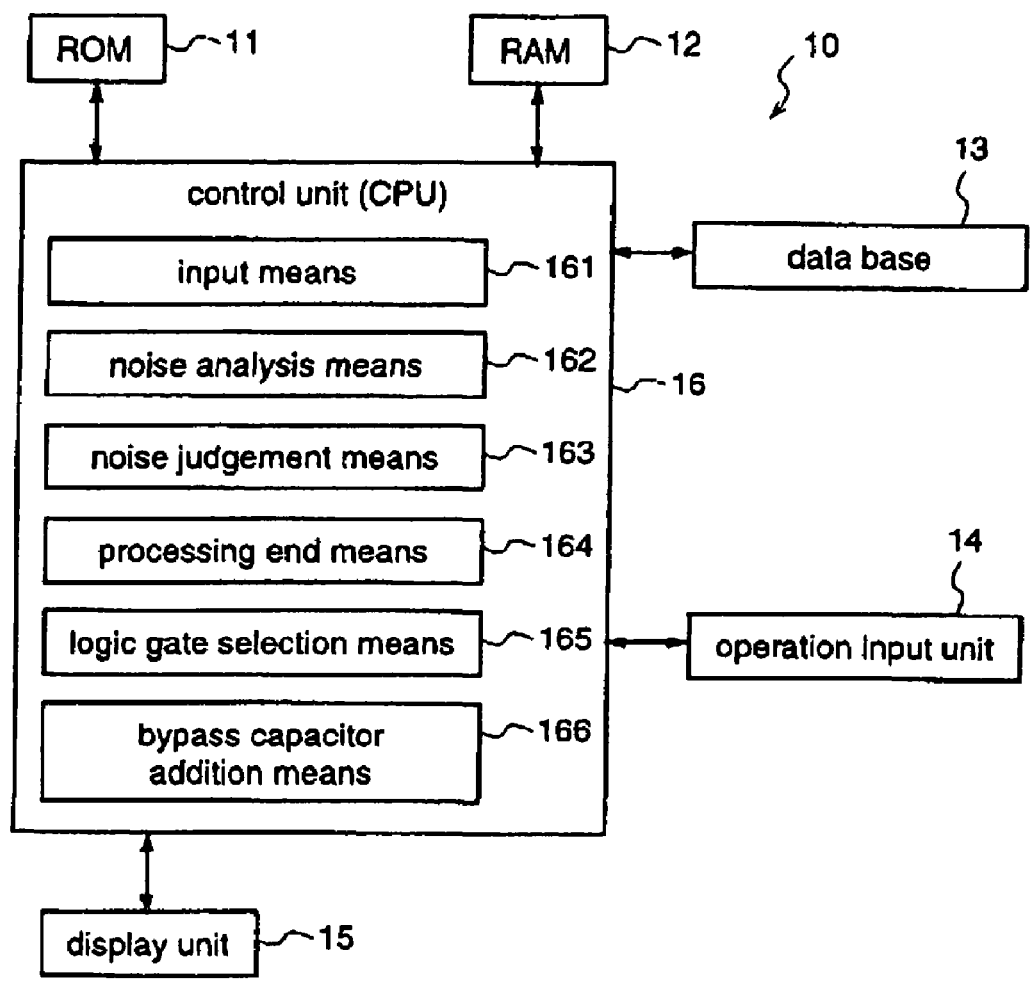
FIG. 1 is a block diagram illustrating examples of major constituents of a low-noise LSI designing apparatus according to a first embodiment of the present invention.

FIG. 1 is a block diagram illustrating examples of major constituents of a low-noise LSI designing apparatus according to the first embodiment of the present invention.

In FIG. 1, a low-noise LSI designing apparatus 10 comprises a ROM 11 as a first storage unit (readable recording medium) in which a control program and data for circuit design are stored, a RAM 12 as a second storage unit which functions as a work memory, a data base 13 in which various kinds of data for circuit design are stored, an operation input unit 14 which enables the user to input various kinds of operation commands (including start or end command for circuit design), a display unit 15 which enables display of various kinds of screen information such as an initial screen of circuit design, and a control unit 16 for controlling the respective parts on the basis of the control program and data. The low-noise LSI designing apparatus 10 so constructed supports circuit design of a semiconductor integrated circuit.

The control unit 16 is constituted by a CPU (Central Processing Unit), and includes an input means 161, a noise analysis means 162, a noise judgement means 163, a processing ending means 164, a logic gate selection means 165, and a bypass condenser addition means 166. The control unit 16 automatically generates a processing circuit pattern to which a bypass condenser 94 is added, by repeating a series of processings after noise analysis to addition of a bypass condenser until the whole processing is completed.

The input means 161 receives various kinds of circuit design information of circuit blocks constituting a semiconductor integrated circuit (LSI), such as gate level logic circuit information 60, standard cell library information 70, package information 80 and the like (refer to FIG. 2 described later), as noise analysis information from the data base 13.

The noise analysis means 162 performs noise analysis for the respective circuit blocks constituting the semiconductor integrated circuit (LSI), using the inputted various kinds of circuit design information.

The noise analysis means 162 may create a data table which contains, for a logic gate in each circuit block as a constituent of the semiconductor integrated circuit (LSI), at least one of a current waveform of a power supply current and a current waveform of a substrate current, which is obtained when the input pattern of the logic gate and the capacitance of a bypass condenser incorporated in the logic gate are changed, thereby to perform noise analysis rising the data table.

The noise judgement means 163 judges whether the amount of noise that occurs in each logic gate in the circuit block (noise voltage level, number of noise occurrences, and the like) is within a predetermined range or not, on the basis of a result of the noise analysis by the noise analysis means 162. When the noise judgement means 163 judges that the amount of noise is within the predetermined range, the processing ending means 164 ends the whole processing of semiconductor IC design for automatically generating a pattern of the semiconductor IC.

When the noise judgement means 163 judges that the amount of noise is out of the predetermined range, the logic gate selection means 165 selects a logic gate having noise larger than a predetermined amount of noise from among the logic gates in each circuit block.

For example, the logic gate selection means 165 selects a logic gate that generates a maximum amount of noise (maximum noise voltage level, maximum number of noise occurrences, and the like) in each circuit block, on the basis of the result of the noise analysis by the noise analysis means 162.

The bypass condenser addition means 166 adds a bypass condenser for reducing power supply noise and substrate noise to the logic gate selected by the logic gate selection means 165.

Hereinafter, the operation of the low-noise LSI designing apparatus constructed as described above will be described.

Figure 2:
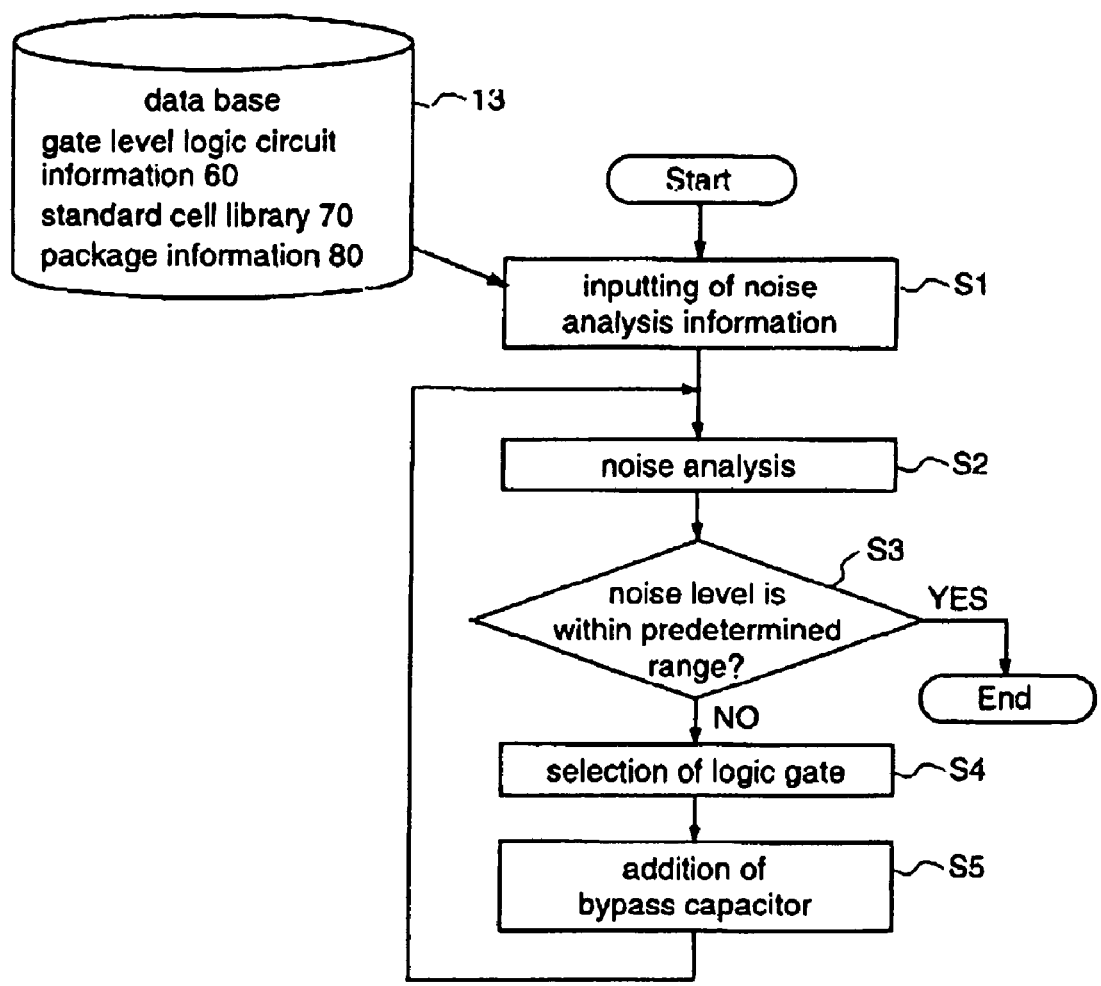
FIG. 2 is a flowchart illustrating a procedure of a low-noise LSI designing method according to the first embodiment of the present invention.

FIG. 2 is a flowchart for explaining the operation of the low-noise LSI designing apparatus according to the first embodiment. In this first embodiment, analysis of substrate noise will be described as an example.

With reference to FIG. 2, initially, as a noise analysis information inputting step S1, the control unit 16 receives the logic circuit information 60 of the circuit blocks constituting the LSI device, the standard cell library information 70 to be used, and the package information 80 of the LSI device, from the data base 13, on the basis of the control program.

Next, in step S2, the control unit 16 performs noise analysis on the basis of the control program. As for this noise analysis, a technique other than circuit simulation is proposed because it is difficult to realize noise analysis by a circuit simulator in regard to its processing time and required memory capacitance.

As an example of noise analysis in step S2 (substrate noise analysis), for example, a method disclosed in "High-Level Simulation of Substrate Noise Generation Including Power Supply Noise Coupling" by M. V. Heijingen et al. in 2000

Design Automation Conference (hereinafter referred to as prior art 3), can be employed. This noise analysis will be described using FIGS. 3 and 4.

Figure 3:
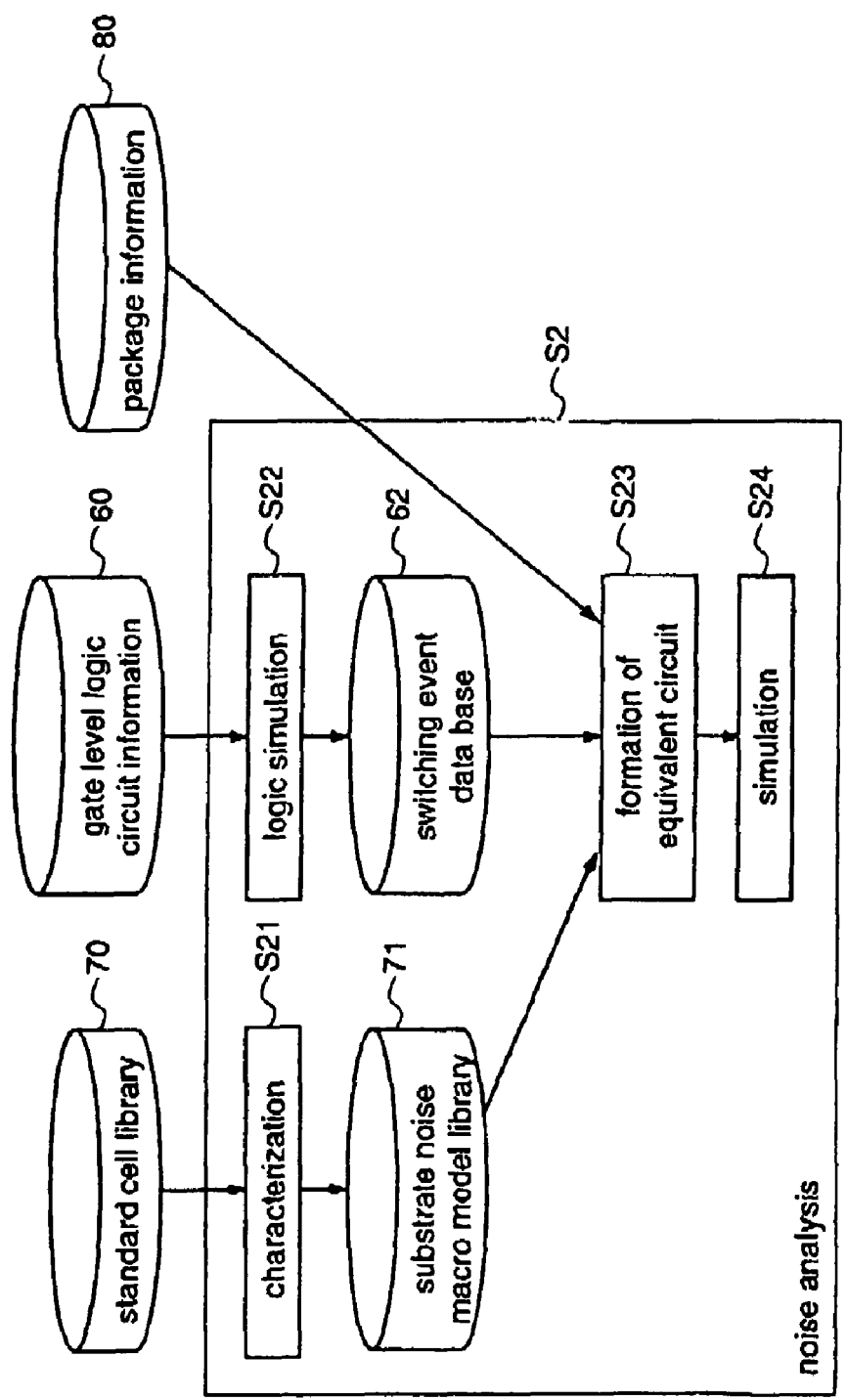
FIG. 3 is a flowchart illustrating an example of a noise analysis process (step S2) shown in FIG. 2.
Figure 4:
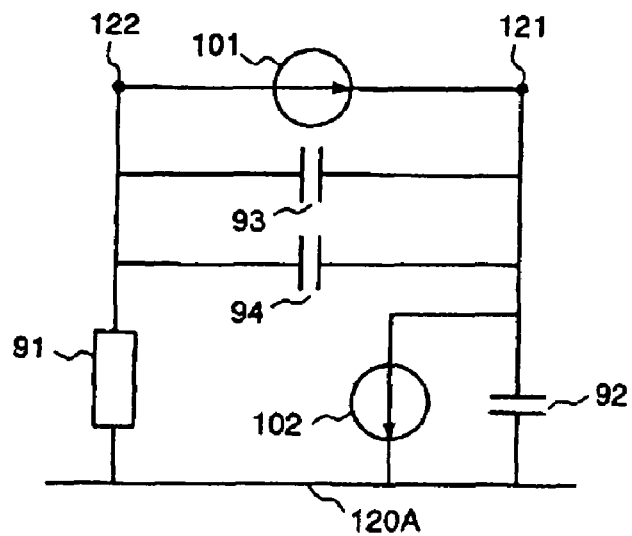
FIG. 4 is an equivalent circuit diagram illustrating a macro model of a cell to be generated in a characterizing process (step S21) shown in FIG. 3.

As shown in FIG. 3, in a characterization step S21, initially, a macro model as shown in FIG. 4 is generated for each cell in the inputted standard cell library 70.

Now, the macro model shown in FIG. 4 will be described. In FIG. 4, a resistance 91 is placed between a ground (Vss) terminal 122 and a P-type substrate 120A, a capacitance 92 is a reverse-based PN junction capacitance between an N well and the p-type substrate 120A, and a Capacitance 93 is parasitically formed between the power supply (Vdd) terminal 121 and the ground (Vss) terminal 122. A current source 101 is obtained by modeling a current supplied from the power supply, and a current supply 102 is obtained by modeling a current that flows from a switching node to the P-type substrate 120A.

The first embodiment of the invention is characterized in that the bypass condenser 94 is intentionally incorporated in the cell, and the macro model of prior art 3 in which the bypass condenser 94 is added is used as a macro model shown in FIG. 4.

The values of the resistance 91 and the capacitances 92~94 can be obtained from the layout of each cell by using a parasitic capacitance extraction tool.

Further, the current sources 101 and 102 are obtained by executing circuit simulation for each cell, and recording the power supply current waveforms and substrate current waveforms for all input patterns, respectively.

Furthermore, the substrate current waveforms and power supply current waveforms in the case where the capacitance of the bypass condenser 94 incorporated in the cell is varied among plural values are also obtained by executing circuit simulation, and recorded on a data table. The substrate current waveforms and power supply current waveforms with the capacitances of the bypass condenser 94 other than those mentioned above, for which no circuit simulation has not previously carried out, can be calculated by performing interpolation based on the data table.

Figure 5:
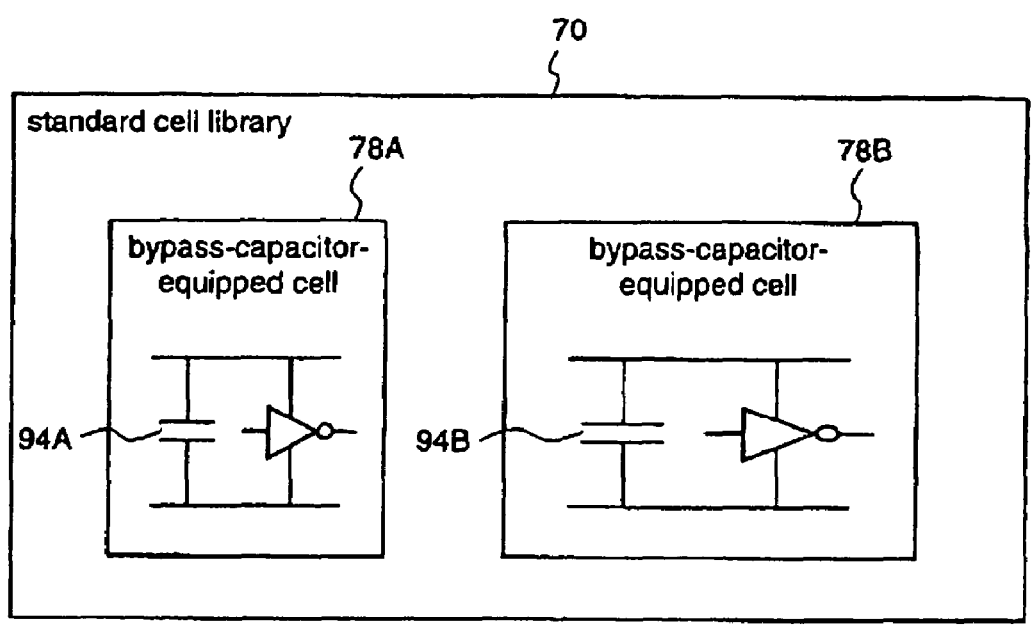
FIG. 5 is an equivalent circuit diagram illustrating cells with bypass condensers in a standard cell library shown in FIG. 2.

As shown in FIG. 5, in the standard cell library 70, several kinds of bypass condenser-equipped cells 78 (e.g., 78A and 78B) having equivalent logic and bypass condensers 94 (e.g., 94A and 94B) of different sizes are prepared. Even when a bypass condenser 94 of another size is needed, the current waveform can easily be obtained by calculation using interpolation based on the data table, and therefore, a desired bypass condenser-equipped cell 78 can be easily added to the micro model shown in FIG. 4.

The macro models of the respective cells in the input standard cell library 70 so created are united to be referred to as a substrate noise macro model library 71. This is recorded in the data base 13.

Next, in a logic simulation step S22 shown in FIG. 2, logic simulation is carried out using the inputted logic circuit information 60 and the input patterns, and the switching events of all cells are recorded in the data base 13 to create a switching event data base 62.

Further, in an equivalent circuit formation step S23, equivalent circuits of the circuit blocks constituting the LSI device are created using the substrate noise macro model library 71, the switching data base 62, and the package information 80.

For example, when the P-type substrate 120A of the LSI device has a low resistance ($\rho \approx 1$ m $\Omega$cm), since the P-type substrate 120A can be approximated to one electrode, all of the macro models are connected in parallel to the substrate electrode, i.e., the P-type substrate 120A. Further, an equivalent circuit of a package created from the package information 80 is connected to the above-mentioned circuit, thereby forming an equivalent circuit of the whole LSI device and package. Thus obtained equivalent circuit is shown in FIG. 6.

Figure 6:
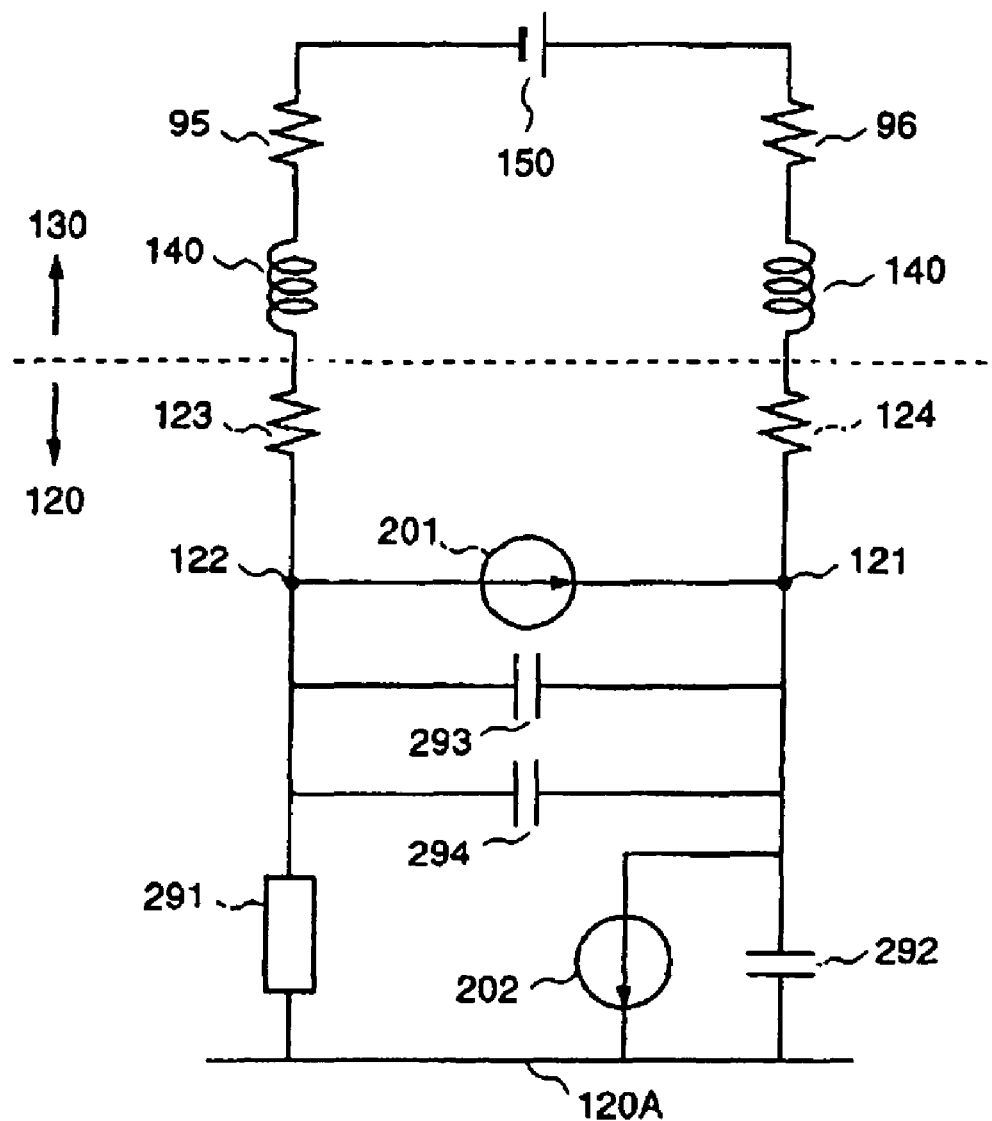
FIG. 6 is an equivalent circuit diagram illustrating an LSI chip and a package which are obtained in an equivalent circuit formation process shown in FIG. 3.

In FIG. 6, a resistance 123 is a ground wiring resistance in the LSI chip 120, and a resistance 124 is a power supply wiring resistance in the LSI chip 120. Further, a capacitance 292 in the LSI chip 120 is obtained by combining the reverse-biased PN junction capacitances 92 between the N wells of the respective standard cells and the P-type substrate 120A. A capacitance 293 is obtained by combining the parasitic capacitances 93 between the Vdd and the Vss of the respective standard cells. A capacitance 294 is obtained by combining the bypass condensers 94 of the respective standard cells. A current source 201 is obtained by combining the current sources 101 supplied from the power sources of the respective standard cells. A current source 202 is obtained by combining the current sources 102 which flow from the switching nodes of the respective standard cells to the substrate.

On the other hand, an inductance 140 of one bonding wire on the package 130, a ground wiring resistance 95, an external power supply 150, a power supply wiring resistance 96, and an inductance 140 of the other bonding wire are connected in series between the resistances 123 and 124 on the LSI chip 120.

Turning to FIG. 3, in a simulation step S24, the equivalent circuit created in the equivalent circuit creation step S23 is analyzed using a circuit simulator, thereby performing substrate noise analysis.

Turning to FIG. 2, in step S3, the control unit 16 performs noise judgement as to whether the amount of noise of each logic gate in the circuit block is within a predetermined range or not, on the basis of the control program.

Based on a result of the noise analysis in step S2, when the amount of noise that occurs in the logic gate (the noise voltage level, the number of noise occurrences, and the like) is within the predetermined range, the noise judgement is ended (processing ending step). When the amount of noise (the noise voltage level, the number of noise occurrences, and the like) is out of the predetermined range, the operation goes to a logic gate selection step S4.

In the logic gate selection step S4, from among the logic gates (hereinafter referred to as instant cells 76) in the circuit block, an instance cell 76 (refer to FIGS. 14 and 15 described later) which generates noise more than the predetermined value (or has a noise voltage level higher than the predetermined value) and is expected to provide excellent noise reduction effect when a bypass condenser 94 is added to it, is selected.

Since there are several methods for selecting the instance cell 76, some of them will be described hereinafter.

In the first method, an instance cell 76 which generates a maximum noise (noise voltage level, number of noise occurrences, and the like) is selected on the basis of the result of the noise analysis (step S2). In the case of substrate noise, since the noise reception circuit is an analog circuit, an influence of each instance cell 76 on the analog circuit is analyzed in the noise analysis step S2, and an instance cell 76 having a maximum noise influence level is selected.

In the second method, a noise influence level, which defines the degree of influence relating to noise occurrence in each instance cell 76, is calculated not from the result of actual noise analysis but from the power supply current waveform and substrate current waveform of each cell in the substrate noise macro model library 71, the switching event data base 62, and the floor plan of the LSI chip 120, and then an instance cell 76 having a maximum noise influence level is selected.

Assuming that the substrate noise is the target, the following four items are considered as noise influence levels of each instance cell 76.

(1) $\Delta I/\Delta t$ of the Power Supply Current Waveform

This may be obtained using the result of circuit simulation as it is.

There have conventionally been proposed many methods for approximating the power supply current waveform with a triangle, for example, one of them is disclosed in "di/dt Noise in CMOS Integrated Circuits" Kluwer Academic Publishers (prior art 4).

Figure 7:
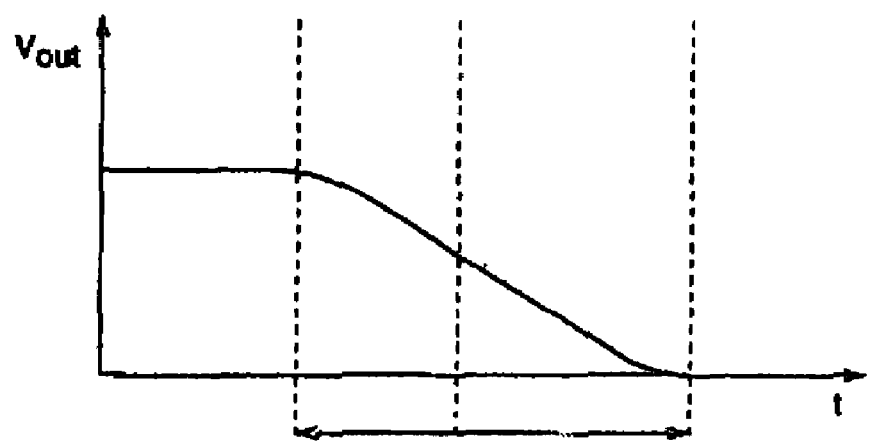
FIG. 7(*a*) is a voltage waveform diagram at an output node of an inverter circuit shown in FIG. 5, and FIG. 7(*b*) is a power supply current waveform diagram at a power supply terminal.
Figure 7:
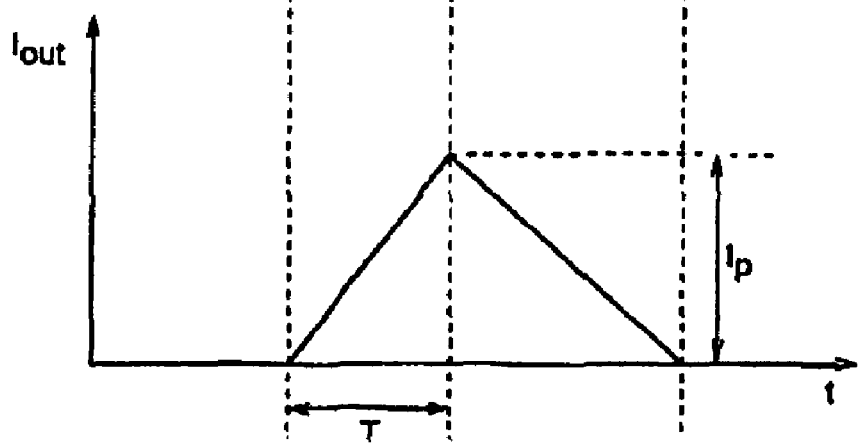
Figure 16:
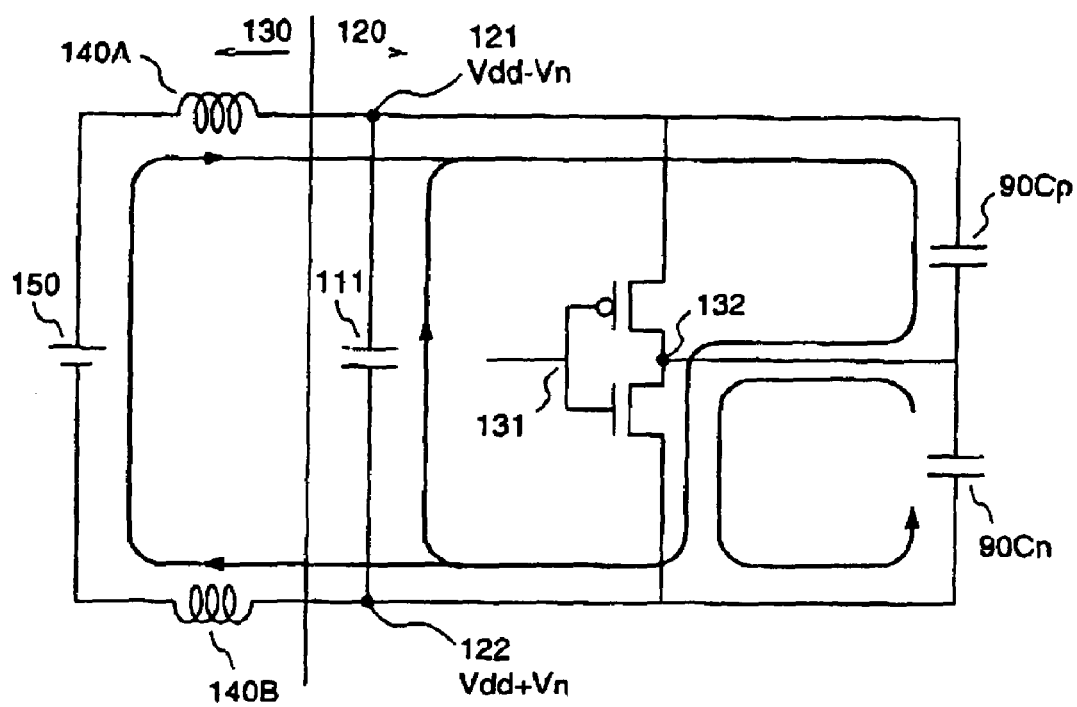
FIG. 16 is an equivalent circuit diagram illustrating an LSI chip and a package for explaining a conventional power supply noise occurrence mechanism.

FIG. 7(a) shows a triangle approximation line of a voltage waveform Vout at an output node (refer to an output node 132 in FIG. 16) of the inverter circuit shown in FIG. 5, and FIG. 7(b) shows a triangle approximation line of a power supply current waveform Iout at the power supply terminal 121 (or 122) of the inverter circuit.

In FIGS. 7(a) and 7(b), tf is the falling time of the node 132 at the output end, T is the time until the current at the power supply terminal 121 (or 122) reaches its peak, and Ip is the peak current at the power supply terminal 121 (or 122).

As shown in FIG. 7(b), the $\Delta I/\Delta t$ can be approximated to formula (1) by triangle-approximating the power supply current.

$$\Delta I/\Delta t \approx Ip/T \quad (1)$$

In this first embodiment, the current supply 101 in the macro model shown in FIG. 4 is formed by triangle approximation, whereby the $\Delta I/\Delta t$ can be calculated using formula (1).

(2) Average Substrate Current

This is obtained from the macro model.

(3) Average Power Consumption $$Pave = Ps*Cload*Vdd*f \quad (2)$$

wherein Cload is the load capacitance of the logic gate, Vdd is the power supply voltage, Ps is the switching probability, and f is the clock frequency.

This is obtained from the switching event data base 62 and the gate level logic circuit information 60.

(4) Distance From the Analog Circuit That Receives the Substrate Noise

This is obtained from the floor plan information.

Accordingly, the noise influence level S can be defined as follows using, for example, formulae (1), (2), (3), and (4), and parameters a, b, c, and d.

$$S = a*(1) + b*(2) + c*(3) + d*(4) \quad (3)$$

The noise influence level S (predetermined amount of noise) of each instance cell 76 is calculated using formula (3), and an instance cell 76 having a maximum noise influence level is selected.

Then, in a bypass condenser addition step S5 shown in FIG. 2, the controller 16 adds a bypass condenser 94 to the instance cell 76 that is selected in the logic gate selection step S4, on the basis of the control program.

The bypass condenser addition step will be described with reference to FIG. 5.

As shown in FIG. 5, it is assumed that the standard cell library 70 has the bypass condenser-equipped cells 78A and 78B. These two cells 78A and 78B are equivalent in logic, the capacitances of the bypass condensers 94A and 94B have different values, respectively, and the capacitance of the bypass condenser 94A is smaller than the capacitance of the bypass condenser 94B.

It is assumed that the cell 78A stored in the standard cell library 70 is assigned to the instance cell 76 that is selected in the logic gate selection step S4 shown in FIG. 2. In this case, in the bypass condenser addition step 55, the cell 78A is changed to the cell 78B having a logic equivalent to that of the cell 78A and a capacitance of bypass condenser 94 larger than that of the cell 78A.

When the standard cell library 70 does not include a cell 78 comprising a bypass condenser 94 having a desired capacitance, a cell 78 having the desired bypass capacitance may be newly added in the standard cell library 70.

Thereafter, the bypass condenser addition step S5 shown in FIG. 2 is followed by the noise analysis step S2, and the processings in the steps S2~S5 are repeated until the amount of noise enters the predetermined range, and the processings are ended when the amount of noise enters the predetermined range.

As described above, according to the first embodiment, the bypass condenser 94 having a required capacitance can be added in a more effective place, i.e., in the vicinity of the noise source in the circuit block included in the semiconductor integrated circuit, whereby noise can be reliably restricted to a predetermined range. Further, since addition of the bypass condenser 94 is carried out on the basis of the result of noise analysis for each circuit block, the bypass condenser 94 having d required capacitance can be provided in an accurate and effective position, thereby avoiding an increase in the LSI chip area due to addition of the bypass condenser 94 of unnecessarily large capacitance.

Further, when a semiconductor integrated circuit (LSI) is manufactured using, for circuit design, the semiconductor integrated circuit designing method of the first embodiment, a semiconductor integrated circuit (LSI) that can reliably restrict noise within a predetermined range can be realized without increasing the LSI chip area.

Embodiment 2

Figure 8:
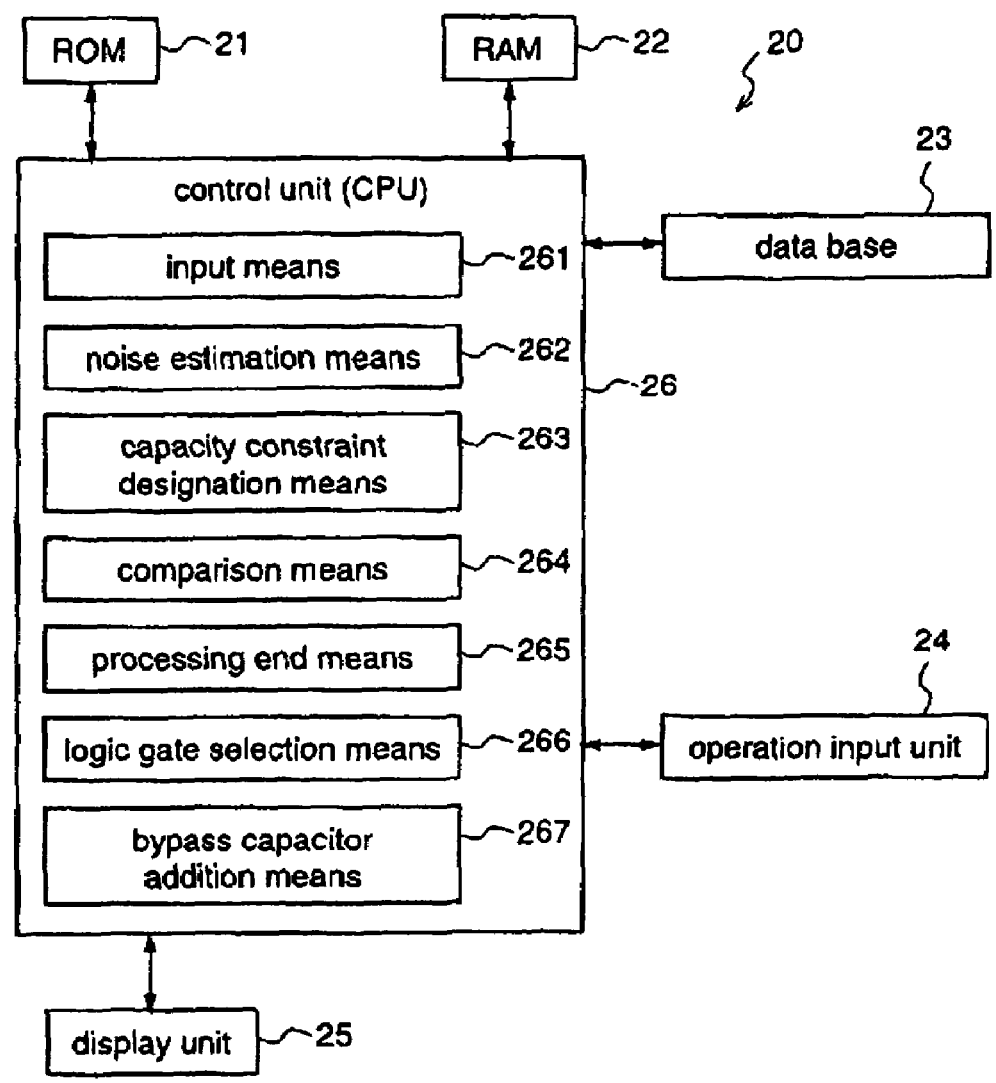
FIG. 8 is a block diagram illustrating examples of major constituents of a low-noise LSI designing apparatus according to a second embodiment of the present invention.

FIG. 8 is a block diagram illustrating examples of main components of a low-noise LSI design apparatus according to a second embodiment of the present invention.

In FIG. 8, a low-noise LSI design apparatus 20 includes a ROM 21 as a third storage unit (readable recording medium) in which a control program and data for circuit design are stored; a RAM 22 as a fourth storage unit which functions as a work memory; a data base 23 in which various kinds of data for circuit design are stored; an operation input unit 24 which enables the user to input operation commands (including a start command and an end command for circuit design); a display unit 25 which enables display of various kinds of screen information such as an initial screen for circuit design; and a control unit 26 which controls the respective units on the basis of the control program and data. The low-noise LSI design apparatus 20 so constructed supports circuit design of a semiconductor integrated circuit.

The control unit 26 is constituted by a CPU (Central Processing Unit) and includes an input means 261, a noise estimation means 262, a capacitance constraint designation means 263, a comparison means 264, a processing ending means 265, a logic gate selection means 266, and a bypass condenser addition means 267. The control unit 26 automatically creates a circuit pattern to which a bypass condenser 94 is added, by repeating a series of processings after the comparison between the on-chip capacitance and the capacitance constraint to the addition of the bypass condenser by the bypass condenser addition means 267 until the whole processing is ended.

The input means 261 receives various kinds of circuit design information (refer to FIG. 9) of circuit blocks constituting an LSI device (LSI chip), such as gate level logic circuit information 60, standard cell library information 70, and package information 80, as noise estimation information, from the data base 23.

The noise estimation means 262 estimates the amount of noise (the noise voltage level, the number of noise occurrences, and the like) which occurs in the LSI device (LSI chip), using the inputted various kinds of circuit design information.

In order to restrict the amount of noise within a predetermined range, the capacitance constraint designation means 263 designates a capacitance constraint that is the capacitance of the bypass condenser 94 for reducing the power supply noise and substrate noise, which is to be incorporated in the circuit block included in the LSI device (LSI chip), on the basis of the result of estimation by the noise estimation means 262.

The comparator 264 compares the on-chip capacitance that is the capacitance of the bypass condenser 94 incorporated in the circuit block with the capacitance constraint designated by the capacitance constraint designation means 263. As a result of comparison by the comparison means 264, when the on-chip capacitance is larger than the capacitance constraint, the processing ending means 265 ends the whole processing of the semiconductor integrated circuit design for automatically generating the pattern of the semiconductor integrated circuit.

When the on-chip capacitance is lower than the capacitance constraint, the logic gate selection means 266 selects a logic gate which generates noise larger than the predetermined amount of noise.

For example, the logic gate selection means 266 calculates a noise influence level of each logic gate in the circuit block, using the inputted information to which the floor plan information of the LSI chip is added, and selects a logic gate having a maximum noise influence level.

The bypass condenser addition means 267 adds a bypass condenser 94 to the logic gate selected by the logic gate selection means 266.

Hereinafter, the operation of the LSI design apparatus 20 constructed as described above will be described.

Figure 9:
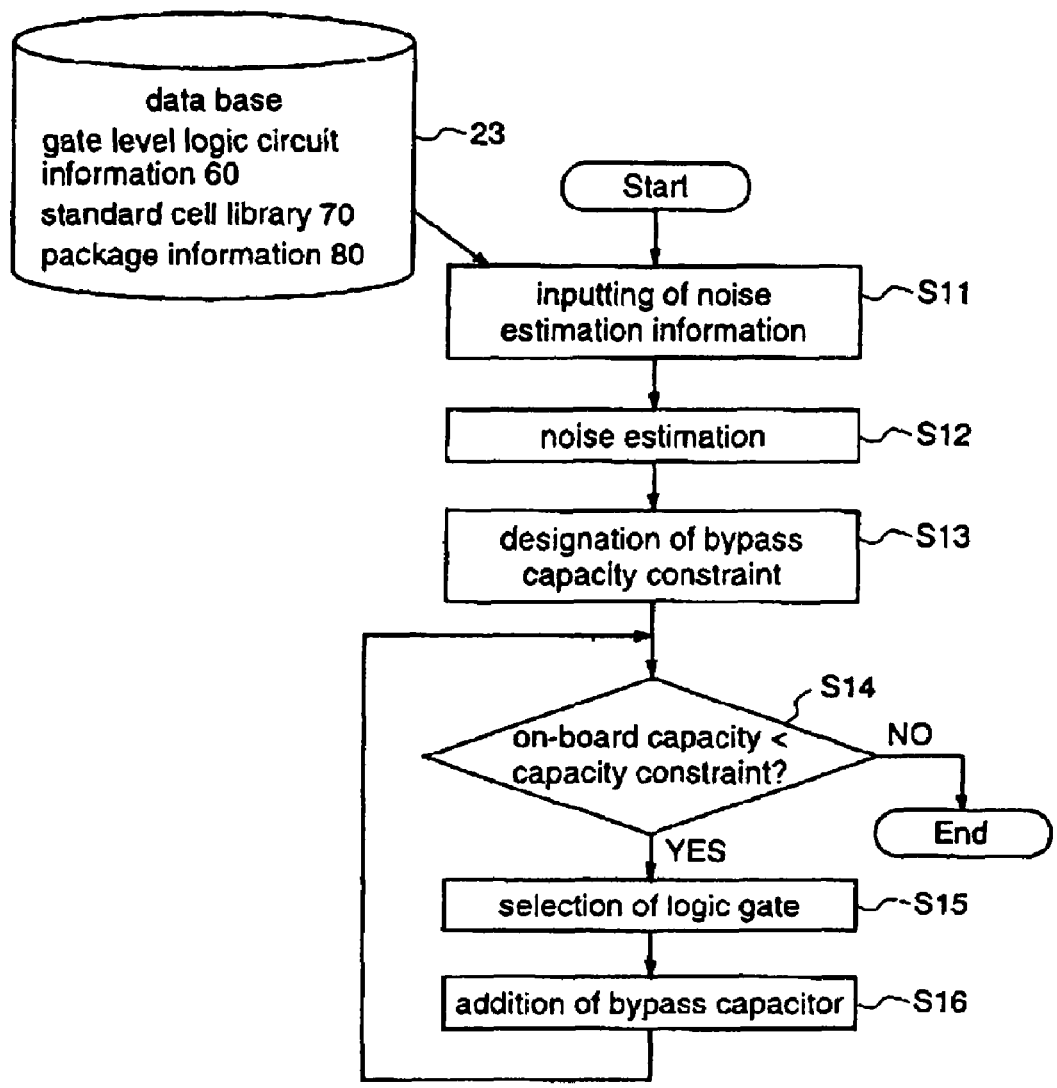
FIG. 9 is a flowchart illustrating a procedure of a low-noise LSI designing method according to the second embodiment of the present invention.

FIG. 9 is a flowchart illustrating a procedure of a low-noise LSI designing method according to the second embodiment of the present invention. In this second embodiment, the procedure will be described taking analysis of power supply noise as an example.

As shown in FIG. 9, initially, in a noise estimation information inputting step S11, the control unit 26 receives gate level logic circuit information 60 of circuit blocks constituting an LSI chip (semiconductor IC), standard cell library information 70 to be used, and package information 80 of the LSI chip, on the basis of the control program. Further, the control unit 26 receives floor plan information of the LSI chip as desired.

Next, in a noise estimation step S12, the control unit 26 estimates an amount of noise to occur (noise voltage level Vn and the number of noise occurrences), on the basis of the control program, from the noise estimation information such as the gate level logic circuit information 60, the standard cell library information 70, and the LSI chip package information 80, which are inputted in the noise estimation information inputting step 511. As a method for estimation, the method disclosed as prior art 4 can be employed.

In FIG. 6, for example, the maximum noise voltage level Vnmax of the noise voltage level Vn that occurs at the power supply terminal 121 and the ground terminal 122 is represented by $$Vn\max \leq (C\text{load}) \times Vdd/2(Cd + C\text{load}) \quad (4)$$

wherein Cload is the load capacitance 90, and Cload=Cn when the output changes from "L" to "H" while Cload=Cp when the output changes from "H" to "L".

Next, in a bypass capacitance constraint designation step S13, the control unit 26 designates a bypass capacitance constraint, which is necessary for reducing the amount of noise (maximum noise voltage level) Vnmax to lower than a predetermined level, on the basis of the control program. To be specific, a required capacitance Cd of a bypass condenser is calculated using formula (4) and then designated.

Next, in an on-chip capacitance judgement step S14, the control unit 26 compares the on-chip capacitance which is the capacitance of the bypass condenser incorporated in the circuit block with the capacitance constraint which is designated in the bypass capacitance constraint designation stop S13, on the basis of the control program. When the on-chip capacitance is larger than the capacitance constraint (NO), the control unit 26 ends the processing. When the on-chip capacitance is equal to or smaller than the capacitance constraint (YES), the control unit 26 proceeds to a cell selection step S15 that follows.

In the cell selection step S15 (logic gate selection step), an instance cell 76 is selected, which generates a large amount of noise at the logic gate in the circuit block, and seems to provide a high noise reduction effect when a bypass condenser is added to it.

To be specific, a noise influence level, which defines the degree of influence relating to occurrence of power supply noise in each instance cell 76, is calculated, and an instance cell 76 having a maximum noise influence level is selected.

When the power supply noise is the target, the noise influence level of each instance cell 76 can be calculated considering one item as follows.

(1) $\Delta I/\Delta t$ of the Power Supply Current Waveform

A triangle approximation of the power supply current, which is described for the logic gate selection step S4 of the first embodiment, is previously obtained for all cells, whereby the $\Delta I/\Delta t$ can be calculated using formula (1).

$$\Delta I/\Delta t \approx Ip/T \quad (1)$$

wherein T is the time until the current at the power supply terminal 120 reaches its peak, and Ip is the peak current at the power supply terminal.

Accordingly, the noise influence level S can be defined by $$S = Ip/T \quad (5)$$

The noise influence level S of each instance cell 76 is calculated using formula (5), and an instance cell 76 having a maximum noise influence level is selected.

Next, in a bypass condenser addition step S16 shown in FIG. 9, the control unit 26 adds a bypass condenser 94 to the instance cell 76 that is selected in the sell selection step S15, on the basis of the control program. This is realized by, for example, changing the selected instance cell 76 to a cell having a larger capacitance of the bypass condenser 94, in like manner as the bypass condenser addition step S5 described for the first embodiment.

Thereafter, turning to the on-chip capacitance judgement step 514, the respective processings in steps S14~S16 are repeated until the on-chip capacitance becomes larger than the capacitance constraint in step S14.

As described above, according to the second embodiment of the present invention, since a bypass condenser 94 having a required capacitance can be added in the vicinity of a noise source in the circuit block included in the LSI device, noise can he reliably limited within a predetermined range. Further, since a bypass capacitance constraint, which is necessary for reducing the amount of noise to a predetermined level or lower, is previously given by noise estimation, it is not necessary to repeat the respective processings as in the first embodiment to perform noise analysis, and therefore, the processing can be carried out in a shorter time.

Further, when a semiconductor integrated circuit (LSI) is manufactured using, for circuit design, the semiconductor integrated circuit designing method of the second embodiment, a semiconductor integrated circuit (LSI) that can reliably restrict noise within a predetermined range is manufactured in a shorter time.

Embodiment 3

Figure 10:
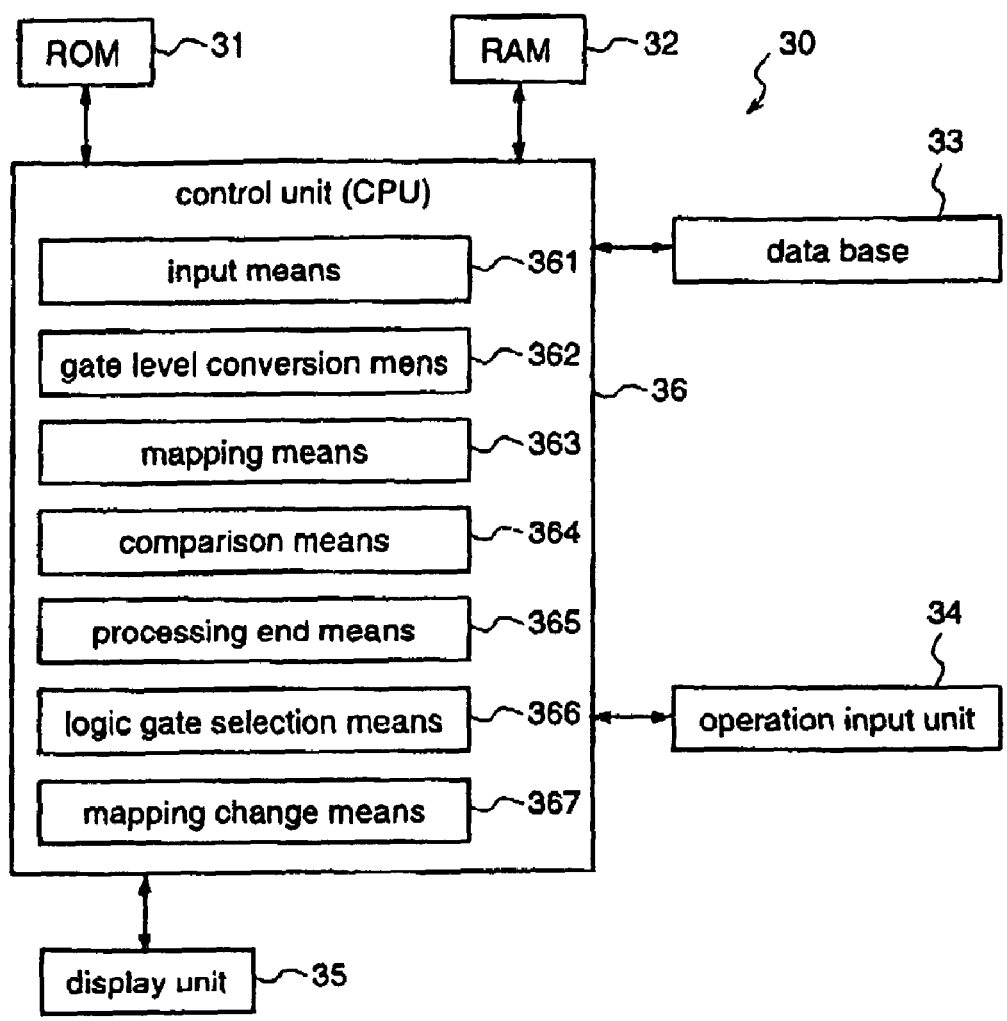
FIG. 10 is a block diagram illustrating examples of major constituents of a low-noise LSI designing apparatus according to a third embodiment of the present invention.

FIG. 10 is a block diagram illustrating examples of major constituents of a low-noise LSI design apparatus according to a third embodiment of the present invention.

In FIG. 10, a low-noise LSI design apparatus 30 comprises a ROM 31 as a fifth storage unit (readable recording medium) in which a control program and data for circuit design are stored; a RAM 32 as a sixth storage unit which functions as a work memory; a data base 33 in which various kinds of data for circuit design are stored; an operation input unit 34 which enables the user to input operation commands; a display unit 35 which enables display of various kinds of screen information such as an initial screen; and a control unit 36 which controls the respective parts on the basis of the control program and data. The LSI design apparatus 30 so constructed supports circuit design of a semiconductor circuit.

The control unit 36 is constituted by a CPU (Central Processing Unit), and includes an input means 361, a gate level conversion means 362, a mapping means 363, a comparison means 364, a processing ending means 365, a logic gate selection means 366, and a mapping change means 367. The control unit 36 automatically generates a circuit pattern to which a bypass condenser is added, by repeating a series of processings from comparison of the on-chip capacitance with the capacitance constraint by the comparison means 364 to mapping change by the mapping change means 367, until the whole processing is ended.

The input means 361 receives, from the data base 33, logic circuit function specification information (HDL) 65 and standard cell library information 70 of circuit blocks constituting an LSI device (LSI chip), and a capacitance constraint 68 (refer to FIG. 11) that is the capacitance of a bypass condenser 94 for reducing power supply noise and substrate noise which should be incorporated in the circuit block to restrict the amount of noise within a predetermined range.

The gate level conversion means 362 converts the logic circuit to gate level logic circuits on the basis of the function levels.

The mapping means 363 performs mapping for assigning the cells in the standard cell library information 70 to the respective logic gates in the gate level logic circuit.

The comparison means 364 compares the on-chip capacitance that is the capacitance of the bypass condenser 94 incorporated in the logic circuit with the capacitance constraint. When the on-chip capacitance is larger than the capacitance constraint as a result of comparison by the comparison means 364, the processing ending means 365 outputs the gate level logic circuit information 66 to the data base 33 to store the information 66 in the data base 33, and thereafter, ends the whole processing for automatically generating the pattern of the semiconductor integrated circuit.

When the on-chip capacitance is lower than the capacitance constraint, the logic gale selection means 366 selects a logic gate which generates noise larger than a predetermined amount of noise.

The mapping change means 367 assigns another cell to the logic gate selected by the logic gate selection means 366, while cell is equivalent in logic to the mapping cell that has been assigned to the logic gate in the mapping step by the mapping means 363 and has an internal bypass condenser 94 having a different capacitance from that of the mapping cell. Alternatively, the mapping change means 367 may additionally assign a bypass condenser cell comprising only a bypass condenser 94 to the mapping cell.

Hereinafter, the operation of the LSI design apparatus 30 constructed a3 described above will be described.

Figure 11:
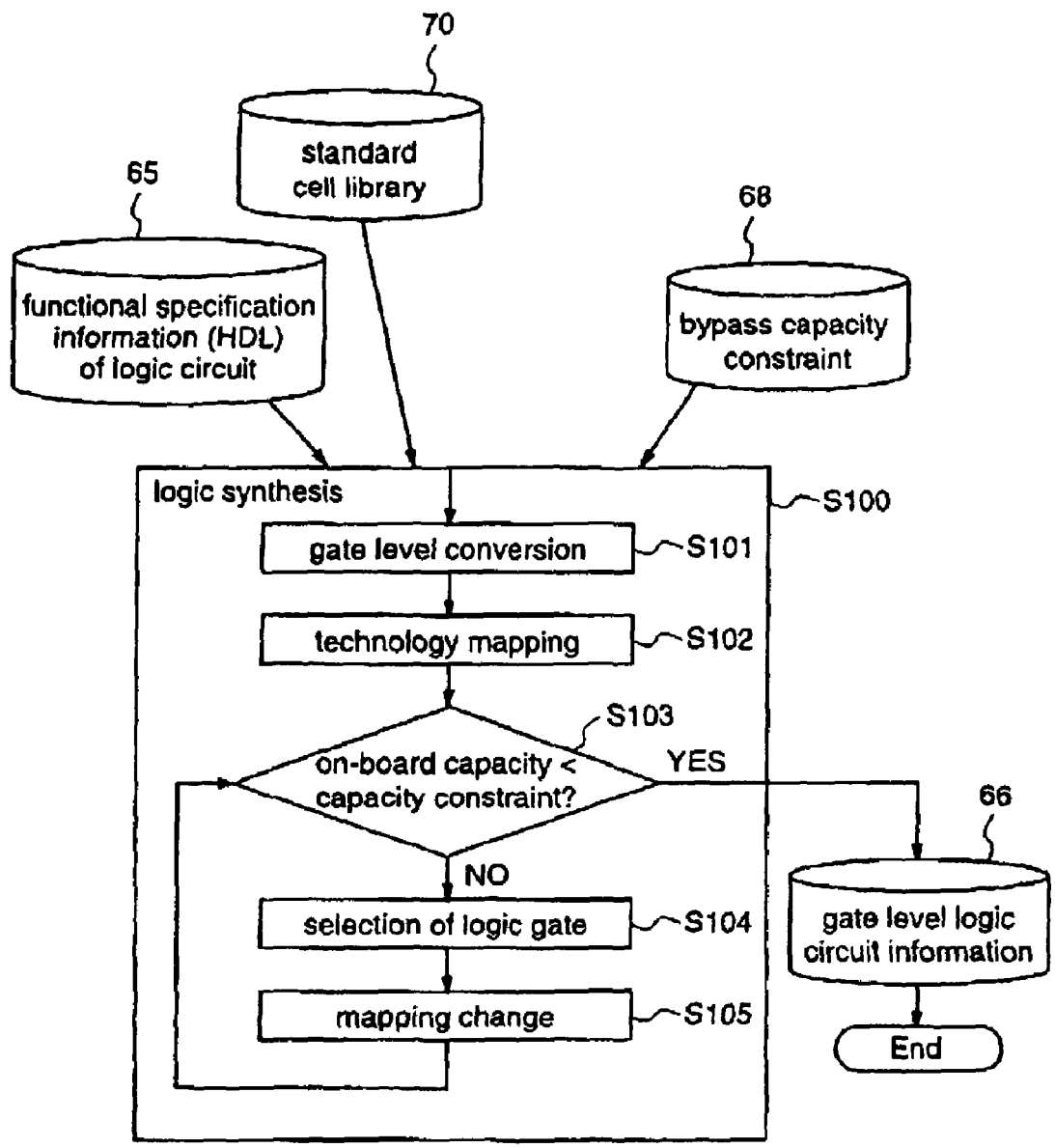
FIG. 11 is a flowchart illustrating a procedure of a low-noise LSI designing method according to the third embodiment of the present invention.

FIG. 11 is a flow chart illustrating a procedure of a low-noise LSI design method according to the third embodiment of the present invention.

As shown in FIG. 11, in a logic synthesis step S100, initially, the control unit 36 receives the functional specification information (HDL) 65 of the logic circuit, the standard cell library information 70, and the bypass capacitance constraint 63, from the data base 33, on the basis of the control program.

The capacitance constraint 68 of the bypass condenser 94 is a constraint relating to the capacitance of the bypass condenser 94 to be incorporated in the circuit block to reduce the amount of noise (noise voltage level, the number of noise occurrences, and the like), and the capacitance constraint 68 may be manually designated and stored in the data base 33 in advance.

Furthermore, using the inputted functional specification information (HDL) 65 of the logic circuit, power consumption P of the circuit block is estimated with a commercially available consumption power estimation tool, and a load capacitance Cload of the circuit block is obtained using formula (6) as follows. The obtained load capacitance Cload is input to formula (4) described for the second embodiment to calculate a necessary capacitance Cd of the bypass condenser, and the capacitance Cd may be designated as the capacitance constraint 68 of the bypass condenser.

$$Cload = P/f \cdot Vdd^2 \qquad (6)$$

wherein Cload is the load capacitance of the login gate, P is the power consumption, f is the frequency of clock, and Vdd is the power supply voltage.

IL is assumed that the standard cell library 70 includes the bypass condenser-equipped cells 78 having equivalent logic and different capacitances of the internal bypass condensers 94. For example, the standard cell library 70 which is described for the first embodiment using FIG. 5 is an example.

Figure 15:
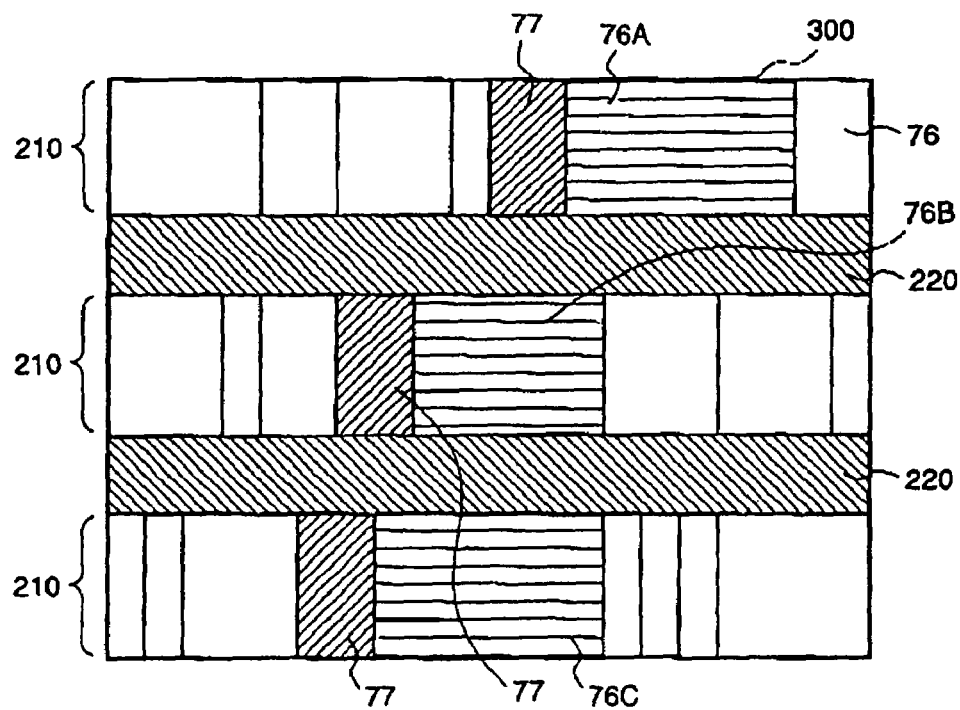
FIG. 15 is a diagram illustrating the state where bypass condenser cells are arranged in cell lines.

Further, the standard cell library 70 may include bypass condenser cells 77 comprising only bypass condensers 94 (refer to FIG. 15).

The logic synthesis step S100 comprises the following processings.

Initially, in a gate level conversion step S101 after the input processing, the logic circuit is converted from the functional specification (HDL) to the gate levels.

Next, in a technology mapping step S102, mapping for assigning the cells in the standard cell library 70 to be used to all of the logic gates in the circuit block, is carried out.

The third embodiment of the invention is characterized by that the whole cell assignment is carried out to satisfy the given bypass capacitance constraint 68. The logic gates to which the cells are assigned are called instance cells 76.

Next, in a on-chip capacitance at judgement in step S103, the on-chip capacitance which is the total of the capacitances of the bypass condensers 94 which are currently incorporated in the circuit block 300 (refer to FIGS. 14 and 15) is compared with the bypass capacitance constraint 68. When the on-chip capacitance is larger than the capacitance constraint 68, the gate level logic circuit information 66 is output to the data base 33 to end the processing.

On the other had, when the current on-chip capacitance is smaller than the capacitance constraint 68, the operation proceeds to a logic gale selection step S104 that follows.

In the logic gate selection step S104, an instance cell 76 which seems to generate noise larger than a predetermined value, seems to generate a maximum amount of noise, and seems to provide a high noise reduction effect when the bypass condenser 94 is increased, is selected from among the instance cells 76 in the circuit block.

This selection can be carried out in like manner as the logic gate selection step S15 described for the second embodiment.

In the following mapping change step S105, a cell to be assigned is changed to a cell 78 which is equivalent in logic to the selected instance cell 76 and has a size of the bypass condenser 94 different from that of the selected cell 76, from among the cells stored in the standard cell library 70.

It is now assumed that, in the technology mapping step S102, a cell 78A in the standard cell library 70 shown in FIG. 5 is assigned to the instance cell 76 that is selected in the logic gate selection step S104.

In this case, in tile mapping change step S105, a cell to be assigned is changed from the cell 78A to a cell 78B that is equivalent in logic to the cell 78A and has a capacitance of the bypass condenser 94 larger than that of the cell 78.

Alternatively, in the mapping change step S105, a bypass condenser cell 77 comprising a bypass condenser 94 alone may be additionally assigned to the instance cell 70 selected in the logic gate selection Step S104. That is, two cells, i.e., the cell 78A and the bypass condenser cell 77 comprising only a bypass condenser 94, are assigned to the instance cell 76.

Next, turning to the on-chip capacitance judgement step S103, the respective processings in steps S103~S105 are repeated until the whole processing is ended.

As described above, according to the third embodiment of the invention, a bypass condenser-equipped cell can be assigned to a logic gate having a large amount of noise while satisfying a bypass capacitance constraint 68. Therefore, it is possible to provide a logic synthesis method by which a bypass condenser 94 having a required capacitance can be added in a more effective position, i.e., in the vicinity of a noise source in the circuit block to reliably restrict noise within a predetermined range.

Further, when a semiconductor integrated circuit (LSI) is manufactured using, for circuit design, the semiconductor integrated circuit designing method of the third embodiment, a semiconductor integrated circuit (LSI) that can reliably restrict noise within a predetermined range can be manufactured by adding a bypass condenser having a required capacitance in the vicinity of a noise source in the circuit block.

Embodiment 4

Figure 12:
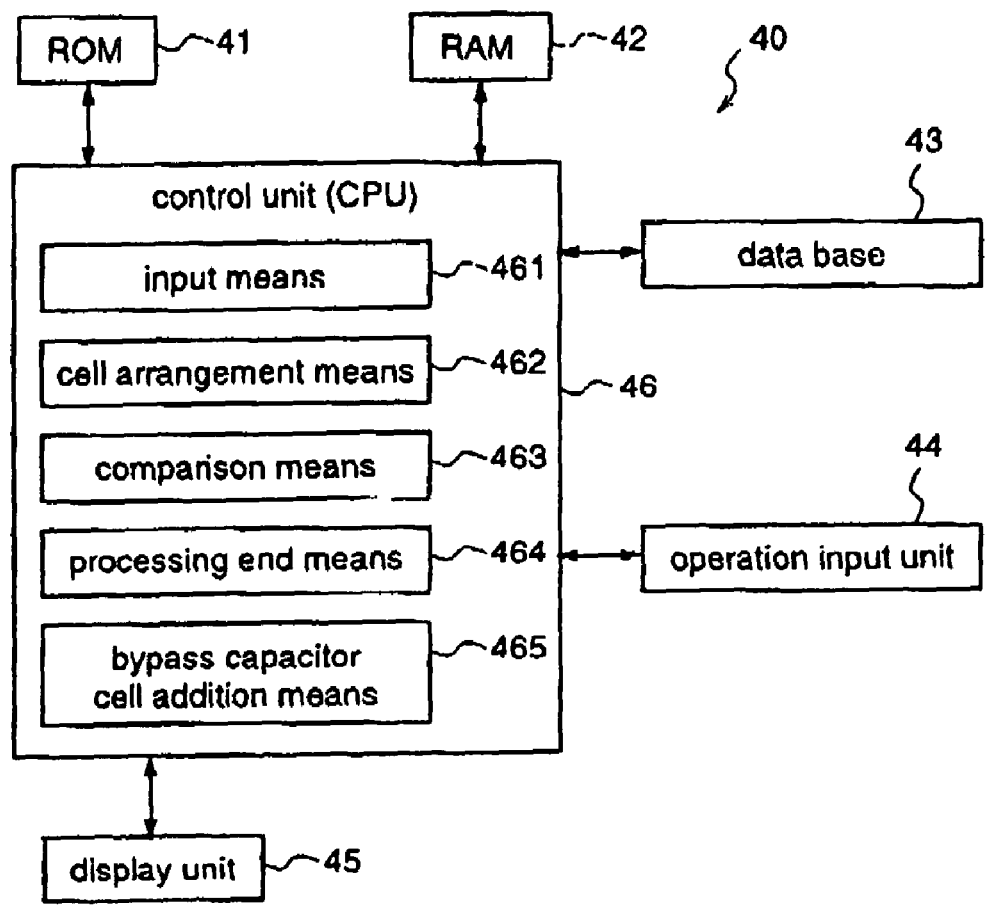
FIG. 12 is a block diagram illustrating examples of major constituents of a low-noise LSI designing apparatus according to a fourth embodiment of the present invention.

FIG. 12 is a block diagram illustrating examples of major constituents of a low-noise LSI design apparatus according to a fourth embodiment of the present invention.

In FIG. 12, a low-noise LSI design apparatus 40 comprises ROM 41 as a seventh storage unit (readable recording medium) in which a control program and data for circuit design are stored; a RAM 42 as an eighth storage unit that functions as a work memory; a data base 43 in which various kinds of data for circuit design are stored; an operation input unit 44 which enables the user to input operation commands; a display unit 45 which enables display of various kinds of screen information such as initial screen; and a control unit 46 which controls the respective units on the basis of the control program and data. The low-noise LSI design apparatus 40 supports circuit design of a semiconductor IC (LSI chip).

The control unit 46 is constituted by a CPU (Central Processing Unit), and includes an input means 461, a cell arrangement means 462, a comparison means 463, a processing ending means 464, and a bypass condenser cell addition means 465. The control unit 46 automatically generates a circuit pattern by repeating a series of processings from comparison between an on-chip capacitance with a capacitance constraint by the comparison means 463 to insertion of a bypass condenser cell by the bypass condenser cell addition means 465, until the whole processing is ended.

The input means 461 receives, from the data base 43, a net list 63 of a circuit block as a constituent of a semiconductor integrated circuit, a cell library 71 including bypass condenser cells each comprising at least one bypass condenser for reducing power supply noise and substrate noise, and a capacitance constraint 68 (refer to FIG. 13 described later) which is a capacitance of a bypass condenser that should be incorporated in the circuit block to reduce the amount of noise (noise voltage level and the number of noise occurrences).

The cell arrangement means 462 arranges the cells in a plurality of parallel cell lines, according to the net list 63.

The comparison means 463 compares the on-chip capacitance that is the capacitance of the bypass condenser incorporated in the circuit block with the bypass capacitance constraint 68. The processing ending means 464 ends the whole processing of the semiconductor IC design for automatically generating a pattern of the semiconductor IC, when the on-chip capacitance is larger than the capacitance constraint in the comparison step by the comparison means 463.

The bypass condenser cell addition means 465 inserts a bypass condenser cell in the cell line when the on-chip capacitance is smaller than the bypass capacitance constraint.

Hereinafter, the operation of the low-noise LSI design apparatus 40 constructed as described above will be described.

Figure 13:
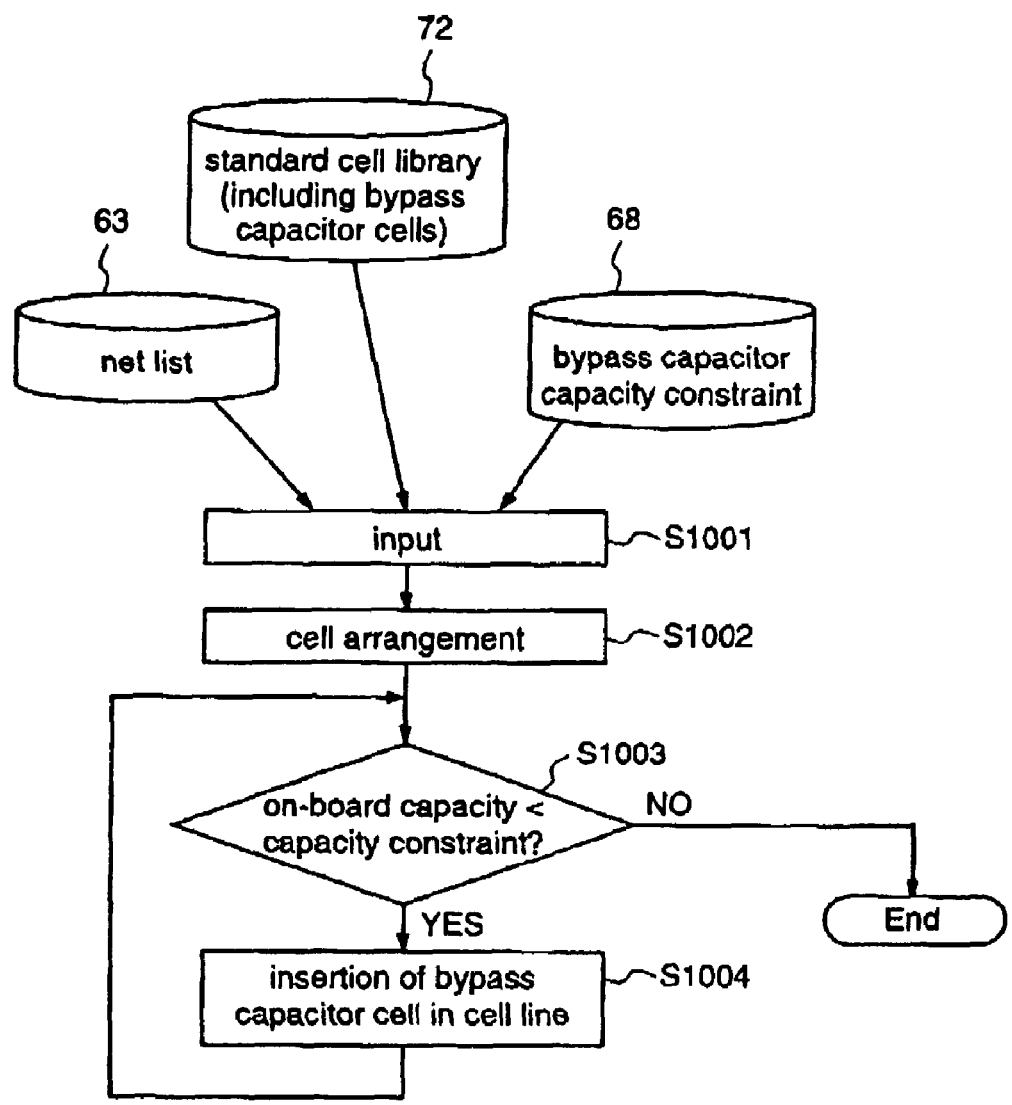
FIG. 13 is a flowchart illustrating a procedure of a low-noise LSI designing method according to the fourth embodiment of the present invention.

FIG. 13 is a flowchart illustrating a procedure of a low-noise LSI layout design method according to the fourth embodiment of the invention.

As shown in FIG. 13, in an inputting step S1001, the control unit 46 receives the net list 63 of the circuit block as a constituent of the LSI chip, the cell library information 71 including at least one bypass condenser cell 77 comprising only a bypass condenser, and the capacitance constraint 6B of the bypass condenser to be incorporated in the circuit block.

For example, it is assumed that a cell 77A having a bypass capacitance A is prepared as a bypass condenser cell 77 included in the cell library 72 (refer to FIG. 15).

The bypass capacitance constraint 68 can be manually specified by using designing know-how in the past or the like. It is now assumed that 3A is designated as the bypass capacitance constraint.

Figure 14:
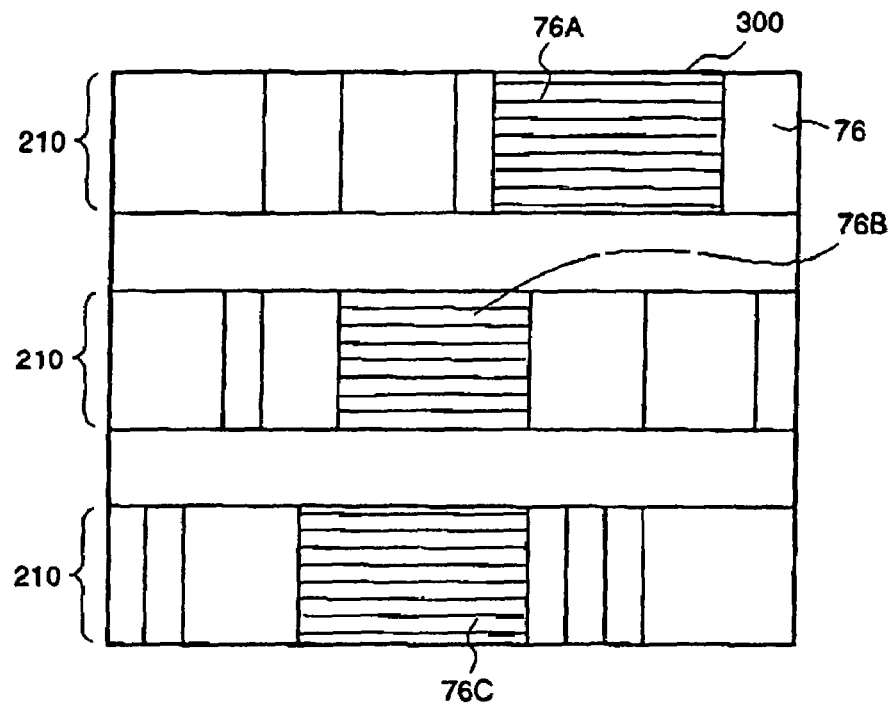
FIG. 14 is a diagram illustrating the state after cell arrangement.

Next, in a cell arrangement step S1002, the control unit 46 arranges the cells 76 in the circuit block 300 (refer to FIGS. 14 and 15) in the plural cell lines 210 that are parallel with each other, according to the net list 63, on the basis of the control program. FIG. 11 shows the state after the cell arrangement. With reference to FIG. 14, in the circuit block 300, the cells 76 are arranged in the three cell lines 210 which are parallel with each other.

Further, in an on-chip capacitance judgement step S1003, the control unit 46 compares the on-chip capacitance which is a total of the capacitances of the bypass condensers 94 currently incorporated in the circuit block 300 with the bypass capacitance constraint 68 which is specified in the inputting step S1001, on the basis of the control program. When the on-chip capacitance is larger than the bypass capacitance constraint 68, the processing is ended. On the other hand, when the on-chip capacitance is smaller than the bypass capacitance constraint 69, the operation goes to a bypass condenser cell insertion step S1004 that follows.

In the bypass condenser cell insertion step S1004, the bypass condenser cells 77 are inserted in the cell lines 210 in which the cells 76 have already been arranged.

FIG. 15 shows the state where the bypass condenser cells 77 are inserted in the circuit block 300 shown in FIG. 14. In FIG. 15, reference numeral 220 denotes vacant areas in the circuit block 300.

Although the bypass condenser cells 77 may be inserted in any positions, it is desirable that the bypass condenser cells 77 are inserted in the vicinity of the cells 76 generating great noises.

In FIG. 35, on assumption that a cell having a larger area Includes a larger transistor and therefore it has a higher possibility of generating greater noise, the bypass condenser cells 77 are arranged beside the large-area cells 76A, 76B, and 76C.

The bypass condenser cell insertion step S1004 is repeated until the on-chip capacitance in the circuit block 300 exceeds the bypass capacitance constraint 69.

For example, since 3A is given as the bypass capacitance constraint 68 and the bypass condenser cell 77 includes a capacitance of A per cell, the whole processing is completed at the time when three bypass condenser cells 77 are arranged in the circuit block 300 as shown in FIG. 15.

According to the fourth embodiment, as shown in FIG. 15, since the bypass condenser cells 77 can be inserted in the cell lines 210 arranged in the circuit block 300, the places for arranging the bypass condensers can be secured in the vicinity of the noise sources, whereby the amount of noise can be reliably restricted to a predetermined range.

Further, when a semiconductor integrated circuit (LSI) is manufactured using, for circuit design, the semiconductor integrated circuit designing method of the fourth embodiment, it is possible to manufacture a semiconductor integrated circuit (LSI) in which noise can be reliably restricted to a predetermined range by securing places for arranging bypass condensers in the vicinity of noise sources and inserting bypass condenser cells in the places.

While in the first embodiment formula (3) is described as an example of calculation for noise influence level, the present invention is not restricted thereto.

Further, in the first embodiment, a circuit simulator may be used for noise analysis.

Furthermore, while in the second embodiment formula (5) is employed as an example of calculation for noise influence level, the present invention is not restricted thereto.

Furthermore, in the fourth embodiment, vacant spaces in the circuit block may be used to satisfy the bypass capacitance constraint 68.

To be specific, since, in FIG. 15, a bypass condenser 94 can be formed in a vacant space 220 in the circuit block 300 where no cell line 210 is arranged, the vacant space 220 can be utilized to satisfy the bypass capacitance constraint 68.

Assuming that the capacitance of the bypass condenser 94 to be provided in the vacant space 220 is B and the bypass capacitance constraint 68 is designated as 3A, the bypass condenser cells may be arranged considering that the capacitance constraint 66 is obtained by subtracting B from A, whereby an increase in area due to addition of the bypass condenser cells 77 can be suppressed.

Furthermore, while in the fourth embodiment one kind of cell having a capacitance A is described as the bypass condense cell 77, plural kinds of bypass condenser cells having different capacitances may be used with the same effects as described above.

What is claimed is:

1. A semiconductor integrated circuit designing apparatus for automatically generating a pattern of a semiconductor integrated circuit under control of a computer, said apparatus comprising:

an input means for inputting gate level logic circuit information, standard cell library information, and package information of a circuit block as a constituent of the semiconductor integrated circuit;

a noise estimation means for estimating an amount of noise that may occur in the circuit block, using the information inputted by the input means;

a capacitance constraint designation means for designating a capacitance constraint that is a capacitance of a bypass condenser for reducing power supply noise and substrate noise, which bypass condenser is to be incorporated in the circuit block to restrict the amount of noise within a predetermined range, on the basis of a result of estimation by the noise estimation means;

a comparison means for comparing an on-chip capacitance that is a capacitance of a bypass condenser incorporated in the circuit block, with the capacitance constraint;

a processing ending means for ending the automatic generation of the pattern of the semiconductor integrated circuit, when the on-chip capacitance is larger than the capacitance constraint in the comparison by the comparison means;

a logic gate selection means for selecting a logic gate in the circuit block, which logic gate generates an amount of noise equal to or larger than a predetermined amount of noise, when the on-chip capacitance is equal to or smaller than the capacitance constraint in the comparison by the comparison means; and a bypass condenser addition means for adding a bypass condenser to the logic gate selected by the logic gate selection means.

2. A semiconductor integrated circuit designing apparatus as defined in claim 1, wherein the logic gate selection means calculates a noise influence level which is a degree of influence of noise that occurs in each logic gate in the circuit block, using the inputted information and floor plan information of the semiconductor integrated circuit, and selects a logic gate having a maximum noise influence level.

3. A semiconductor integrated circuit designing apparatus for automatically generating a pattern of a semiconductor integrated circuit under control of a computer, said apparatus comprising:

an input means for inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range;

a gate level conversion means for converting the functional specification information of the logic circuit into gate level logic circuit information on the basis of functional levels;

a mapping means for performing a mapping process of assigning cells in the standard cell library information to all logic gates in the gate level logic circuit, respectively;

a comparison means for comparing an on-chip capacitance which is a capacitance of a bypass condenser that is incorporated in the logic circuit subjected to the mapping by the mapping means, with the capacitance constraint;

a processing ending means for ending the automatic generation of the pattern of the semiconductor integrated circuit, when the on-chip capacitance is larger than the capacitance constraint in the comparison by the comparison means;

a logic gate selection means for selecting a logic gate which generates an amount of noise larger than a predetermined amount of noise, when the on-chip capacitance is smaller than the capacitance constraint in the comparison by the comparison means; and a mapping change means for assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate.

4. A semiconductor integrated circuit designing apparatus for automatically generating a pattern of a semiconductor integrated circuit under control of a computer, said apparatus comprising:

an input means for inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise;

a cell arrangement means for arranging cells in a plurality of cell lines that are parallel with each other, according to the net list information;

a comparison means for comparing an on-chip capacitance that is a capacitance of a bypass condenser incorporated in the circuit block, with the capacitance constraint;

a processing ending means for ending the automatic generation of the pattern of the semiconductor integrated circuit when the on-chip capacitance is larger than the capacitance constraint in the comparison by the comparison means; and a bypass condenser cell addition means for inserting a bypass condenser cell in the cell lines when the on-chip capacitance is equal to or smaller than the capacitance constraint in the comparison by the comparison means.

5. A semiconductor integrated circuit designing method for automatically generating a pattern of a semiconductor integrated circuit under control of a computer, said method comprising:

an input step of inputting gate level logic circuit information, standard cell library information, and package information of a circuit block as a constituent of the semiconductor integrated circuit;

a noise estimation step of estimating an amount of noise that may occur in the circuit block, using the inputted information;

a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate;

wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint.

6. A semiconductor integrated circuit designing method as defined in claim 5, wherein the logic gate selection step calculates a noise influence level which is a degree of influence of noise that occurs in each logic gate in the circuit block, using the inputted information and floor plan information of the semiconductor integrated circuit, and selects a logic gate having a maximum noise influence level.

7. A semiconductor integrated circuit designing method for automatically generating a pattern of a semiconductor integrated circuit under control of a computer, said method comprising:

an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range;

a gate level conversion step of converting the functional specification information of the logic circuit into gate level logic circuit information on the basis of functional levels;

a mapping step of performing a mapping process for assigning cells in the standard cell library information to all logic gates in the gate level logic circuit, respectively;

a comparison step of comparing an on-chip capacitance which is a capacitance of a bypass condenser that is incorporated in the logic circuit subjected to the mapping process, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate;

wherein, after the other cell is assigned or the bypass condenser cell is additionally assigned in the mapping change step, the processing returns to the comparison step, wherein the on-chip capacitance that is the capacitance of the bypass condenser incorporated in the circuit block in which the other cell is assigned or the bypass condenser cell is additionally assigned, is compared with the capacitance constraint.

8. A semiconductor integrated circuit designing method as defined in claim 7, wherein the standard cell library information is cell library information to be used for design of the semiconductor integrated circuit, and includes information of at least one set of bypass condenser-incorporated cells having equivalent logic and different capacitances of the incorporated bypass condensers.

9. A semiconductor integrated circuit designing method for automatically generating a pattern of a semiconductor integrated circuit under control of a computer, said method comprising:

an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise;

a cell arrangement step of arranging cells in a plurality of cell lines that are parallel with each other, according to the net list information;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step;

wherein, after the bypass condenser cell is inserted in the bypass condenser cell addition step, the processing returns to the comparison step, wherein the on-chip capacitance that is the capacitance of the bypass condenser incorporated in the circuit block in which the bypass condenser cell is inserted, is compared with the capacitance constraint.

10. A semiconductor integrated circuit manufacturing method for manufacturing a semiconductor integrated circuit using, for circuit design, a semiconductor integrated circuit designing method for automatically generating a pattern of the semiconductor integrated circuit under control of a computer, said semiconductor integrated circuit designing method comprising:

an input step of inputting gate level logic circuit information, standard cell library information, and package information of a circuit block as a constituent of the semiconductor integrated circuit;

a noise estimation step of estimating an amount of noise that may occur in the circuit block, using the inputted information;

a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate;

wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint.

11. A semiconductor integrated circuit manufacturing method for manufacturing a semiconductor integrated circuit using, for circuit design, a semiconductor integrated circuit designing method for automatically generating a pattern of the semiconductor integrated circuit under control of a computer, said semiconductor integrated circuit designing method comprising:

an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range;

a gate level conversion step of converting the functional specification information of the logic circuit into gate level logic circuit information on the basis of functional levels;

a mapping step of performing a mapping process for assigning cells in the standard cell library information to all logic gates in the gate level logic circuit, respectively;

a comparison step of comparing an on-chip capacitance which is a capacitance of a bypass condenser that is incorporated in the logic circuit subjected to the mapping process, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate;

wherein, after the other cell is assigned or the bypass condenser cell is additionally assigned in the mapping change step, the processing returns to the comparison step, wherein the on-chip capacitance that is the capacitance of the bypass condenser incorporated in the circuit block in which the other cell is assigned or the bypass condenser cell is additionally assigned, is compared with the capacitance constraint.

12. A semiconductor integrated circuit manufacturing method for manufacturing a semiconductor integrated circuit using, for circuit design, a semiconductor integrated circuit designing method for automatically generating a pattern of the semiconductor integrated circuit under control of a computer, said semiconductor integrated circuit designing method comprising:

an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise;

a cell arrangement step of arranging cells in a plurality of cell lines that are parallel with each other, according to the net list information;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step;

wherein, after the bypass condenser cell is inserted in the bypass condenser cell addition step, the processing returns to the comparison step, wherein the on-chip capacitance that is the capacitance of the bypass condenser incorporated in the circuit block in which the bypass condenser cell is inserted, is compared with the capacitance constraint.

13. A readable recording medium in which a semiconductor integrated circuit designing program for making a computer execute processing of designing a semiconductor integrated circuit is computer-readably recorded, said semiconductor integrated circuit designing program comprising:

an input step of inputting gate level logic circuit information, standard cell library information, and package information of a circuit block as a constituent of the semiconductor integrated circuit;

a noise estimation step of estimating an amount of noise that may occur in the circuit block, using the inputted information;

a capacitance constraint designation step of designating a capacitance constraint that is a capacitance of a bypass condenser for reducing power supply noise and substrate noise, which bypass condenser is to be incorporated in the circuit block to restrict the amount of noise within a predetermined range, on the basis of the estimated amount of noise;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate in the circuit block, which logic gate generates an amount of noise equal to or larger than a predetermined amount of noise, when the on-chip capacitance is equal to or smaller than the capacitance constraint in the comparison step; and a bypass condenser addition step of adding a bypass condenser to the selected logic gate;

wherein, after the bypass condenser is added in the bypass condenser addition step, the processing returns to the comparison step, wherein the on-chip capacitance that is the capacitance of the bypass condenser incorporated in the circuit block in which the bypass condenser is added is compared with the capacitance constraint.

14. A readable recording medium in which a semiconductor integrated circuit designing program for making a computer execute processing of designing a semiconductor integrated circuit is computer-readably recorded, said semiconductor integrated circuit designing program comprising:

an input step of inputting functional specification information of a logic circuit block as a constituent of the semiconductor integrated circuit, standard cell library information of the logic circuit block, and a capacitance constraint that is a capacitance of a bypass condenser for reducing power supply noise and substrate noise, which bypass condenser is to be incorporated in the circuit block to restrict the amount of noise within a predetermined range;

a gate level conversion step of converting the functional specification information of the logic circuit into gate level logic circuit information on the basis of functional levels;

a mapping step of performing a mapping process for assigning cells in the standard cell library information to all logic gates in the gate level logic circuit, respectively;

a comparison step of comparing an on-chip capacitance which is a capacitance of a bypass condenser that is incorporated in the logic circuit subjected to the mapping process, with the capacitance constraint;

a processing ending step of ending the automatic generation of the pattern of the semiconductor integrated circuit, when the on-chip capacitance is larger than the capacitance constraint in the comparison step;

a logic gate selection step of selecting a logic gate which generates an amount of noise equal to or larger than a predetermined amount of noise, when the on-chip capacitance is smaller than the capacitance constraint in the comparison step; and a mapping change step of assigning, in place of the mapping cell assigned in the mapping process, another cell that is equivalent in logic to the mapping cell and has an internal bypass condenser having a different capacitance to the selected logic gate, or additionally assigning a bypass condenser cell comprising only a bypass condenser to the selected logic gate;

wherein, after the other cell is assigned or the bypass condenser cell is additionally assigned in the mapping change step, the processing returns to the comparison step, wherein the on-chip capacitance that is the capacitance of the bypass condenser incorporated in the circuit block in which the other cell is assigned or the bypass condenser cell is additionally assigned, is compared with the capacitance constraint.

15. A readable recording medium in which a semiconductor integrated circuit designing program for making a computer execute processing of designing a semiconductor integrated circuit is computer-readably recorded, said semiconductor integrated circuit designing program comprising:

an input step of inputting net list information of a circuit block as a constituent of a semiconductor integrated circuit, cell library information including bypass condenser cells each comprising at least one bypass condenser for reducing power supply noise and substrate noise, and a capacitance constraint that is a capacitance of a bypass condenser for reducing power supply noise and substrate noise, which bypass condenser is to be incorporated in the circuit block to reduce noise;

a cell arrangement step of arranging cells in a plurality of cell lines that are parallel with each other, according to the net list information;

a comparison step of comparing an on-chip capacitance that is a capacitance of a bypass condenser incorporated in the circuit block, with the capacitance constraint;

a processing ending step of ending the automatic generation of the pattern of the semiconductor integrated circuit when the on-chip capacitance is larger than the capacitance constraint in the comparison step; and a bypass condenser cell addition step of inserting a bypass condenser cell in the cell lines when the on-chip capacitance is equal to or smaller than the capacitance constraint in the comparison step;

wherein, after the bypass condenser cell is inserted in the bypass condenser cell addition step, the processing returns to the comparison step, wherein the on-chip capacitance that is the capacitance of the bypass condenser incorporated in the circuit block in which the bypass condenser cell is inserted, is compared with the capacitance constraint.

* * * * *